United States Patent [19]

Hirzel

[11] Patent Number: 4,495,589
[45] Date of Patent: Jan. 22, 1985

[54] AIRCRAFT GROUND VELOCITY DETERMINATION SYSTEM

[75] Inventor: Edgar A. Hirzel, Granada Hills, Calif.

[73] Assignee: Crane Co., New York, N.Y.

[21] Appl. No.: 419,996

[22] Filed: Sep. 20, 1982

[51] Int. Cl.$^3$ ............................................. G01P 3/36
[52] U.S. Cl. ................................... 364/565; 324/160; 356/28
[58] Field of Search ............... 364/426, 565, 569, 428, 364/433; 324/160, 172, 175; 356/27, 28, 4; 377/20, 23, 24; 358/105

[56] References Cited

U.S. PATENT DOCUMENTS

| | | | |
|---|---|---|---|
| 2,866,373 | 12/1958 | Doyle et al. | 88/1 |
| 2,968,034 | 1/1961 | Carafelli, Jr. | 343/112 |
| 3,004,219 | 10/1961 | Albert | 324/70 |
| 3,023,361 | 2/1962 | Conner, Jr. | 324/70 |
| 3,155,974 | 11/1964 | Seling | 343/100 |
| 3,364,485 | 1/1968 | Chiarello | 343/112 |
| 3,366,960 | 1/1968 | Gluck | 343/112 |
| 3,545,268 | 12/1970 | Von Struve | 73/178 |
| 3,603,691 | 9/1971 | Hamilton | 356/152 |
| 3,653,769 | 4/1972 | Albright | 356/141 |
| 3,768,910 | 10/1973 | Zanoni | 356/167 |
| 3,804,517 | 4/1974 | Meyr et al. | 356/28 |
| 3,819,919 | 6/1974 | McGunigle | 364/565 |
| 3,824,015 | 7/1974 | Petit et al. | 364/565 |
| 3,885,873 | 5/1975 | Andermo | 356/28 |
| 3,888,362 | 6/1975 | Fletcher et al. | 214/1 B |
| 3,918,814 | 11/1975 | Weiser | 356/156 |
| 3,974,500 | 8/1976 | Goldfischer | 343/8 |
| 4,017,721 | 4/1977 | Michaud | 364/513 |
| 4,021,010 | 5/1977 | Bliss | 244/182 |
| 4,041,293 | 8/1977 | Kihlberg | 364/565 |
| 4,106,731 | 8/1978 | Bliss | 244/188 |
| 4,133,503 | 1/1979 | Bliss | 244/188 |
| 4,146,924 | 3/1979 | Birk et al. | 364/513 |
| 4,162,509 | 7/1979 | Robertson | 356/28 |
| 4,269,512 | 5/1981 | Nosler | 356/398 |
| 4,309,104 | 1/1982 | Printz et al. | 356/28 |
| 4,315,201 | 2/1982 | Suzuki et al. | 318/640 |
| 4,319,845 | 3/1982 | Shuji | 356/400 |
| 4,373,816 | 2/1983 | Laib | 356/375 |

OTHER PUBLICATIONS

Fairchild Semiconductor "CCD131 1024—Element Linear Image Sensor", Mar. 1976.
P. Klass, "Interest Rises in In Fraud Search Track", Aviation Week & Space Technology, p. 68 (8/30/82).
"Correlation Functions", p. 171.
Seven Engineering Corporation, Engineering Problem Solver "Final Report, Promising Feature Extraction Methods For Aircraft Ground Speed Determination Using CCD Camera" 2/11/82.
TRW "Multiplier—Accumulators—Parallel 8, 12, or 16 Bits" 1979, 1981.
Reticon "R5401 Binary Analog Correlator".
Reticon "R5403 Analog—Analog Correlator/Convolver".
Melles Griot "Purchasing Information", p. 49 (1975).
"Flying With Safe Flight" Brochure.
"Letters to Editor", Aviation Week & Space Technology", p. 70 (1981).

Primary Examiner—Gary Chin
Attorney, Agent, or Firm—Willian Brinks Olds Hofer Gilson & Lione Ltd.

[57] ABSTRACT

A system for determining the ground velocity of an aircraft is disclosed. The system includes a CCD linear optical image sensor carried by the aircraft for forming a first and second substantially instantaneous light intensity contour of the optical image of the surface of the earth lying below the aircraft. The two contours are delayed in time with respect to each other. A computer, included in the system, compares the two contours to determine the relative position shift between the two contours by utilizing cross-correlation techniques. The computer then corrects the contour position shift for the aircraft altitude and divides the corrected position shift by the time delay between the two contours to obtain the aircraft ground velocity. A signal indicative of the aircraft ground velocity is output by the system.

31 Claims, 7 Drawing Figures

AIRCRAFT GROUND VELOCITY DETERMINATION SYSTEM

BACKGROUND OF THE INVENTION

This invention relates to an apparatus for sensing the relative motion of a second object some distance from the reference sensor without the need of transmitted excitation such as electromagnetic or sonic radiation. In particular, this invention may be used for the rapid measurement of the ground speed of an aircraft while flying at various altitudes.

It is often advantageous for an aircraft to be able to determine rapidly and accurately its ground velocity, as opposed to its velocity with respect to the air. For example, the knowledge of accurate ground speed during the approach and landing phases of the aircraft's operation can provide much useful information for aircraft safety. Knowledge of true ground velocity can improve the proper initialization and operation of the wheel brake anti-skid control system by providing necessary data to the hydroplaning and touchdown spin-up logic of the control system. Also, a continuous comparison between the indicated air speed and true ground speed gives an accurate measurement of the wind component along the axis of the aircraft. This information is essential for determining potential wind shear problems that the aircraft may encounter during approach and landing, and allows the proper correction of the characteristics procedure to be made in order to avoid those potentially disastrous problems.

Other concepts for determining the ground velocity of an aircraft present certain disadvantages. They often rely on a relationship (e.g., cross-correlation) between signals transmitted and received by the aircraft. Thus, they require the aircraft to carry a transmitter, a transmitting antenna, and an energy source for supplying the transmission power. These components add undesirable bulk, weight, and hence expense to the aircraft navigation system. Because these systems depend upon a transmitted signal to bounce off an object and return to the aircraft before it can be processed, they experience substantial time delay in obtaining velocity data. Some such systems (for example, those utilizing the Doppler effect) must bounce the signals off of objects located ahead of the aircraft and thereby may encounter the problem of getting no reflected signal back to the aircraft. This problem is particularly acute when attempting to bounce the signal off of flat horizontal surfaces, such as bodies of water. Also, these active systems inherently possess additional complexity and offer greater potential for failure, thus presenting increased risks as well as problems and costs associated with maintenance and system redundancy. Furthermore, some of these systems utilize moving detectors or a multiplicity of detectors for ground speed determination, adding further complexity which reduces system reliability.

Present wind shear determination systems rely on an inertial reference or ground generators coupled to an elaborate computational network. The time required to present the wind shear data to the flight crew by these systems is considerably more than is desirable for safe flying conditions.

SUMMARY OF THE INVENTION

This invention relates to an improved apparatus for accurately determining the ground velocity of an aircraft and avoids many of the disadvantages of the prior art.

The apparatus utilizes radiant emissions and reflections of the earth's surface, preferably in the optical and infrared regions. The apparatus first senses the radiant emissions and reflections of the earth's surface at two points in time; it then calculates the ground velocity of the aircraft from the relative shift of the sensed emissions and the reflections, the aircraft altitude, and the time delay between the sensing of the successive emissions; and finally it generates a signal indicative of the calculated ground velocity.

The apparatus for determining the ground velocity of an aircraft includes: means for detecting from the aircraft a first substantially instantaneous radiant energy contour of a first area of the earth's surface; the same means, or separate means analogous to the means for detecting a first contour, for detecting a second substantially instantaneous radiant energy contour, delayed in time with respect to the first contour, of a second area of the earth's surface, which second area overlaps in part with the first area; means for comparing the first contour with the second contour to determine the relative shift in position between the two contours; means for correcting the contour position shift by the aircraft altitude and for dividing the contour position shift by the time delay to obtain the ground velocity of the aircraft. Means for indicating the measured velocity is optional.

The apparatus provides a fast, reliable, simple and accurate, yet passive, means for determining the ground speed of an airplane. This system has no radiating parts and preferably no moving parts. Instead, the apparatus of this invention passively depends upon radiant energy, thereby eliminating the need for transmission equipment and the time delay, bulk, weight, and complexity that such equipment inherently adds to a system. As such, a system based on this invention is simpler, more reliable and hence safer than systems utilizing radiating and moving parts. Also, the method of determining the ground velocity utilized by this apparatus is simple, which further simplifies the apparatus necessary to perform it. This system determines the aircraft ground speed directly, independent of factors such as ground coefficient or airspeed, and thus its measurements are more accurate.

This measurement of the ground speed of an aircraft is especially useful during approach and landing when the aircraft is close to the ground. The system provides the data necessary for wind shear computation and real-time velocity and acceleration computations to be utilized by monitoring process controls, alarm systems, and anti-skid brake controls, among others, thus increasing the effectiveness of these systems and improving overall aircraft safety.

These and other advantages of the invention will become apparent during the following description of the presently preferred embodiment of the invention taken in conjunction with the drawings.

DETAILED DESCRIPTION OF THE PREFERRED EMBODIMENT

Figure 1:
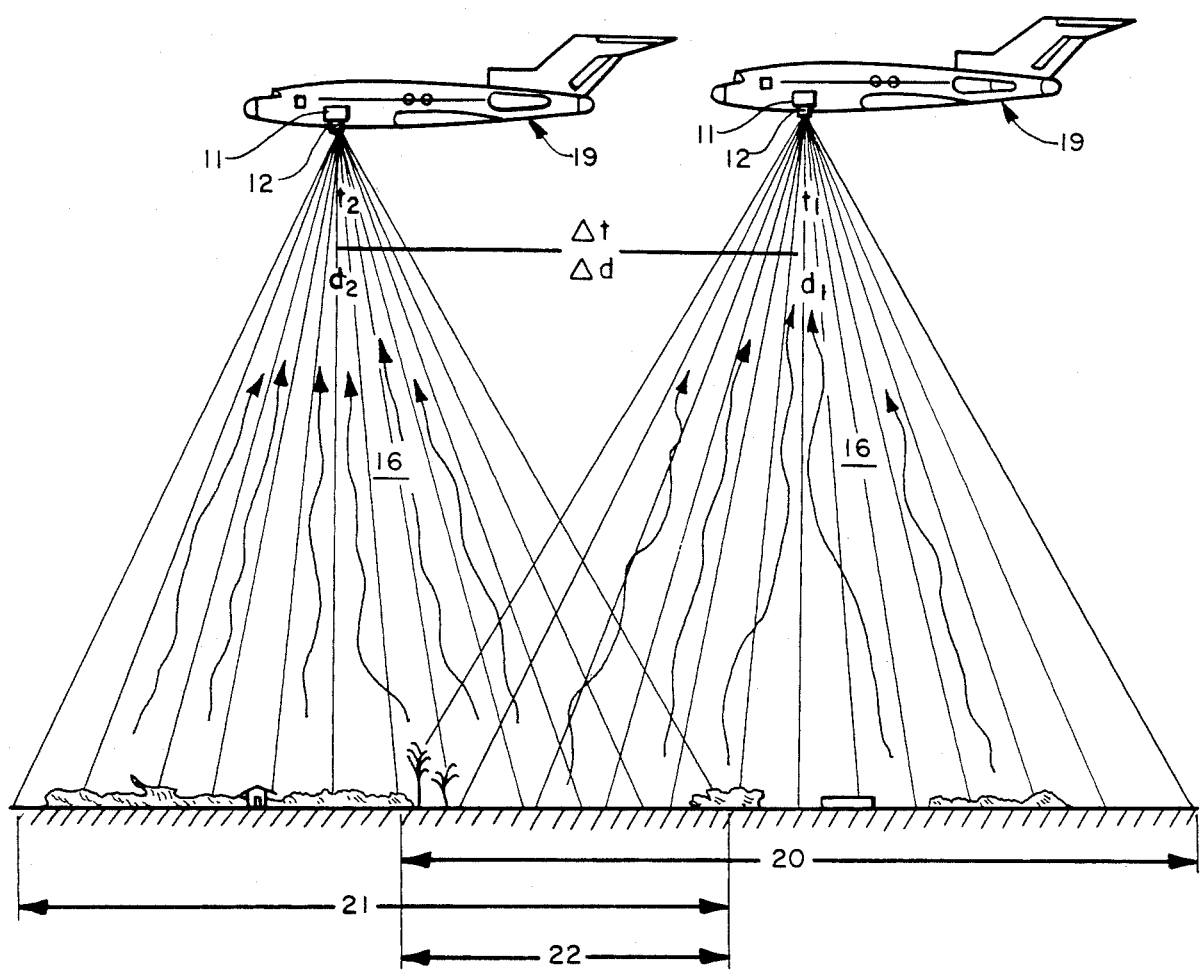
FIG. 1 is a general representation of the operation of the preferred embodiment of the invention, as utilized by an aircraft.
Figure 2:
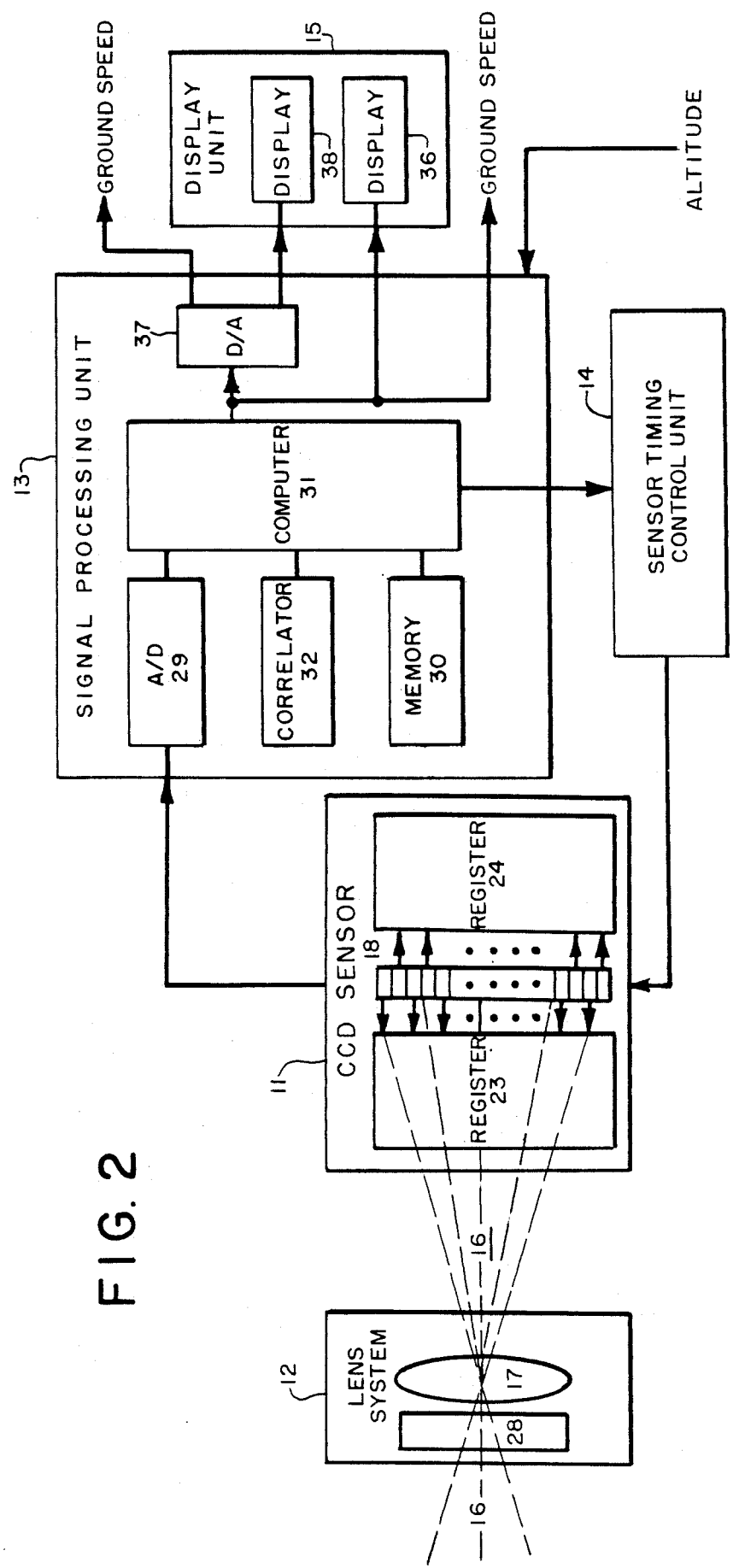
FIG. 2 is a block diagram of the preferred embodiment of the invention.

Turning now to the drawings, FIG. 2 shows a block diagram of the preferred embodiment of the aircraft ground velocity determination apparatus of this invention, designated generally as 10. The system 10 is an optical system responsive to light (preferably of near infrared wavelengths) reflected from or emitted by the earth's surface, including objects located thereon (see FIG. 1). The ground velocity of the aircraft is computed by the system 10 by optically tracking the aircraft 19 position change Δd as measured by the radiant energy incident to the system.

The system 10 is generally comprised of a lens system 12, a CCD (charge coupled device) camera or sensor 11, a signal processing unit 13, a sensor timing control unit 14, and a ground speed display unit 15.

The function of the lens system 12 is to focus impinging light 16 on the CCD sensor 11. As FIG. 1 indicates, the lens system 12 and the CCD sensor 11 are preferably mounted to an aircraft 19 in such an orientation that the field of view of the sensor 11 is centered substantially directly below the aircraft 19; the lens system 12 focuses the light 16 on the sensor 11; and the light 16 comprises an optical image of the surface of the earth beneath the aircraft 19. The lens system 12 and sensor 11 are shown in FIG. 1 in exaggerated form; in actuality, they are minute compared to the size of the aircraft 19. Preferably, the lens system 12 and the sensor 11 are rigidly mounted to the aircraft 19 such that the sensor 11 maintains a constant orientation or perspective perpendicular to the direction of flight of the aircraft 19. Alternatively, the lens system 12 and the sensor 11 may be gimbal mounted to the aircraft 19 such that the sensor 11 maintains a constant orientation or perspective perpendicular to the earth's surface.

The lens system 12 includes at least one lens 17 which preferably has a focal length required for the particular application. For close work, on the order of 10 feet, a 28 mm lens is desirable; for wind shear sensing in the landing pattern, 50 to 55 mm lenses are preferred; and for high altitude work, a 1000 mm lens is preferable. The lens preferably has a fixed focus and may have a plurality of segments. The one used for demonstration was a plastic Fresnel lens made by Melles Griot, 1770 Kettering St., Irvine, Calif. 92714. The preferred lens 17 is preceded by a filter 28 that rejects wavelengths below approximately 0.7 microns. Thus, the filter 28 allows substantially only near infrared wavelengths to reach the lens 17 while effectively rejecting blue wavelengths. This filtering helps to eliminate from the image seen by lens 17 scatter which is caused by fog, haze, rain, etc., and to which the shorter wavelengths, particularily blues, are susceptible. Hence the lens 17 sees a sharp image, virtually independent of atmospheric conditions.

The CCD sensor 11 is a linear image sensor and essentially functions as a camera. It detects or senses light 16 of the optical image which is focused on it by the lens system 12 and forms a record of the impinging image by essentially taking a "snapshot" thereof. The preferred CCD sensor 11 is the RL1024C/17 made by Reticon of 345 Potrero Ave., Sunnyvale, Calif. 94086. This preferred sensor 11 has a linear array of 1024 silicon photodiode detector elements, or pixels 18, arranged in a row. These particular silicon photodetectors are responsive substantially to wavelengths below 1.2 microns. Every other pixel 18, i.e., every odd-numbered pixel 18 of the 1024 pixels 18, is connected to a first analog shift buffer register 23, and the remaining pixels 18, i.e., the even-numbered pixels 18 of the 1024 pixels 18, are connected to a second analog shift buffer register 24.

Each silicon photodiode detector element of the preferred RL1024C/17 is 17 units wide and one unit long. Thus the preferred linear array of 1024 photodiode detector elements is a total of 1024 units long by 17 units wide. The 17 wide unit is preferred because it increases the amount of photons incident to the radiant energy sensitive area of the photodiodes and reduces the transverse shift of the image sensed by the photodiode detector elements. This arrangement results in greater resolution and hence more accurate readings of the radiant energy input data. Through experimentation it was discovered that 17 units was the optimal pixel width. If the pixel width is too wide, the resolution of the incident radiant energy image becomes smothered. On the other hand, as the pixel width decreases the resolution also decreases. In short, any pixel width greater than one unit is preferable up to a certain point and the most preferable range of pixel widths is 2 to 17 units.

Also, the maximum wavelength of radiant energy to which the preferred silicon photodiodes are substantially responsive is 1.2 microns. However, photodetector elements which are responsive to wavelengths above 1.2 microns are presently under development by others and this invention is intended to include those devices. Indeed, the earth's surface emits and reflects a substantial amount of radiant energy above 1.2 microns which this invention can utilize.

The light 16 which impinges on the pixels 18 causes the generation of electrons at each pixel 18. The amount of charge (i.e., the number of electrons generated) at each pixel 18 is linearily proportional to the intensity of light 16 falling upon that pixel 18 and the "exposure" time (i.e., the duration of the period during which the pixels 18 are enabled, or allowed to accumulate charges). The charges accumulated in the series of pixels 18 during the exposure time form a "snapshot" of a contour of the intensity of the light 16 which falls upon the CCD sensor 11. The contour "snapshot" is essentially an identifying signature of the object or area which generated or reflected the light 16.

As the pixels 18 are arranged serially in a row, the light intensity contour formed is a linear contour (i.e., a profile of a cross-section of the optical image falling on the sensor 11). The preferred sensor 11 is positioned on the aircraft 19 with the row of pixels 18 parallel to the longitudinal axis of the aircraft so that the profile is formed along the same axis. This profile is used to measure forward ground speed of the aircraft. Alternatively, sensors having multiple side-by-side rows of pixels (i.e., two dimensional pixel arrays) may be used. With such an arrangement of sensors, for example, every row of pixels may be utilized to form a separate contour. Or the sensed image can be integrated transversely across the rows of pixels (i.e., along each column of pixels) to take advantage of more light reaching the sensor and to thus obtain a more intense image. It is also possible to use the two-dimensional pixel array to form a two-dimensional, planar contour which can generate an indication of both the forward ground speed and lateral ground speed (lateral drift) of the aircraft.

The registers 23,24 are used to store the charges accumulated by their associated pixels 18. Because half of the pixels 18 are connected to the first register 23 and the other half are connected to the second register 24, each of the registers 23,24 may be utilized to store a separate contour generated by its respective pixels 18. This is done by staggering, or delaying in time with respect to each other, the points in time at which the associated pixels 18 of register 23 and register 24 are enabled take a "snapshot". This mode of operation may be explained by reference to FIG. 1. At time $t_1$, the pixels 18 associated with the first register 23 are allowed to form a first light intensity contour 25 (see FIG. 3a). After a time delay $\Delta t$ at time $t_2$, the pixels 18 associated with the second register 24 are allowed to form a second light intensity contour 26 (see FIG. 3b).

Control of the CCD sensor 11, including control of the timing of the pixels 18 and the transfer of the accumulated charges from the pixels 18 to their respective registers 23,24, is executed by a sensor timing control unit 14. The sensor timing control unit 14 coordinates all of the timing parameters of the CCD sensor 11 and sends all of the necessary control signals to the CCD sensor 11. The preferred sensor timing control unit 14 is also manufactured by Reticon. The standard Reticon unit is modified to enable all the odd pixels in unison and all the even pixels in unison. The timing control unit 14 in turn operates under the direction of the signal processing unit 13, which computes the operational parameters for the CCD sensor 11 and commands its action. Thus the timing control unit is essentially an interface between the signal processing unit 13 and the CCD sensor 11.

Figure 3A:
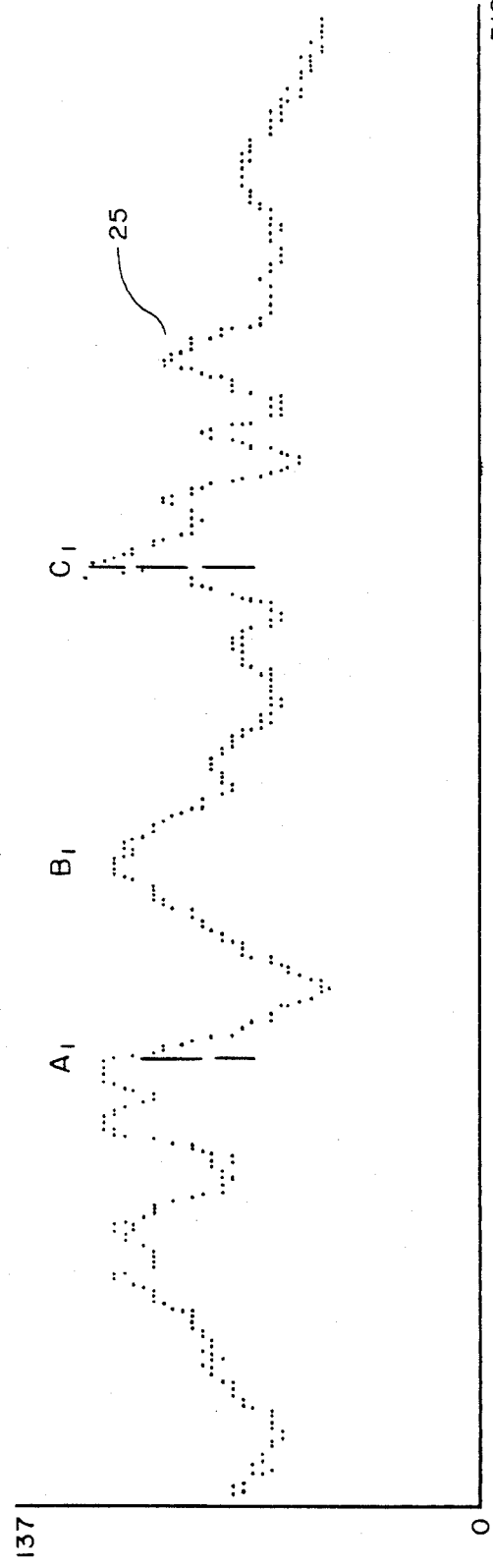
FIGS. 3a and 3b show first and second contours generated by the preferred embodiment of the invention and their relationship.
Figure 3B:
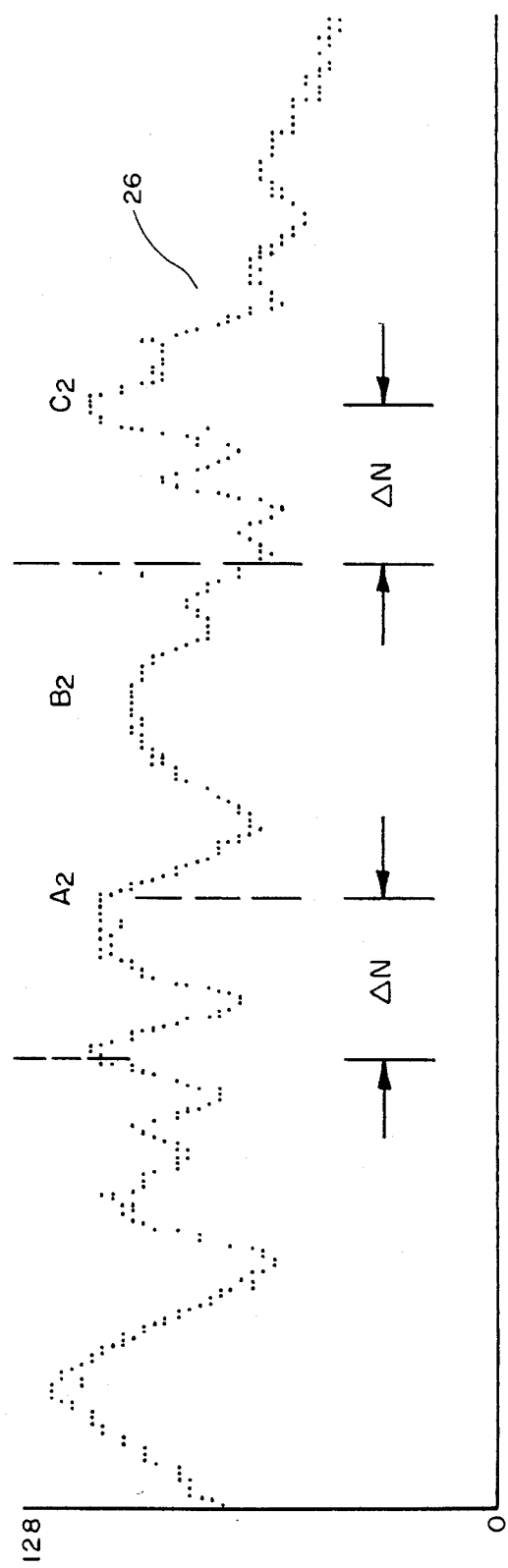

As shown in FIG. 1, at time $t_1$ the sensor timing control unit 14 allows pixels 18 associated with the first register 23 to become exposed to impinging light 16. This causes the detection and formation of the first light intensity contour 25 (see FIG. 3a) representative of a first area, portion 20, of the earth's surface lying in the field of view of the sensor 11 beneath the aircraft 19. At time $t_2$, delayed with respect to time $t_1$ by an amount $\Delta t$, the sensor timing control unit 14 allows the pixels 18 associated with the second register 24 to become exposed to the impinging light 16, thus causing the detection and formation of the second light intensity contour 26 (see FIG. 3b). As the aircraft 19 will have traveled a distance $\Delta d$ during the time $\Delta t$, the field of view of the sensor 11 will have also moved by the distance $\Delta d$ so that the second contour 26 is representative of a second area, portion 21, of the earth's surface beneath the aircraft 19. The delay $\Delta t$ between the formation of the first and second contours 25,26 is controlled by the timing control unit 14 to assure that there is an overlap 22 between the first and second areas 20,21 of the earth's surface, and consequently that there is an overlap between the first and second contours 25,26. The relationship between the first and second contours 25,26 is shown in FIG. 3. Preferably, $\Delta t$ is set such that the image is displaced approximately 100 pixels between the first and second contours. The operation of the timing control unit 14 in controlling the CCD sensor 11 is shown in the Initialization stages of the flowchart of FIG. 5. The operation of the timing control unit 14 will be further described below.

Upon command from the timing control unit 14, initiated by the signal processing unit 13, the charges in the pixels 18 which represent the contours 25,26 are transferred to the buffer registers 23,24, respectively. Upon further command from the timing control unit 14, the contents of the buffer registers 23,24 are serially read out in two sets as voltages, amplified, and transferred to the signal processing unit 13.

In the signal processing unit 13, the signals representative of the contours 25,26 are operated on by a digital computer 31 to derive therefrom the aircraft ground speed. The computer 31 is preferably based on the Z80B microprocessor made by Zilog, 1355 Del. Ave., Campbell, Calif. The computer 31 (Z80B) processes the input data, sets the system timing and performs data handling functions, as shown in the program listing attached as Appendix A. The program is flowcharted in FIG. 5, and an explanation of its operation is given below.

FIG. 3 shows two sets of real-time data obtained during the testing of a prototype device on an aircraft. These are pixel-by-pixel contours as viewed by the CCD sensor 11. FIG. 3a represents the first contour sensed at time $t_1$ and FIG. 3b represents the second contour sensed at time $t_2$. As shown in FIG. 2, the radiant energy profiles for these two sets of data are sensed by the CCD sensor 11 and the analog voltages representative of each profile are converted to digital form by the A/D (analog to digital convertor) 29. These sets of digitized data are then stored in memory 30 for processing. (For flight test purposes only, these sets of data were also digitally recorded on a small floppy disc in order to reproduce the data shown in FIG. 3.) These sets of digital data are then processed in the computer 31 and the correlator 32 to derive the ground velocity. The flow chart, FIG. 5, describes the data processing and computations involved in this process.

In the broadest terms, the processing of the data to derive therefrom the aircraft 19 ground velocity involves comparing the first contour 25 with the second contour 26 to determine the relative position shift between the two contours 25,26, denoted as $\Delta n$ in FIG. 3. This contour position shift $\Delta n$ is then corrected for the aircraft altitude to derive the actual distance $\Delta d$ (see FIG. 1) traversed by the airplane 19 during the time $\Delta t$ between the forming of the two successive contours 25,26. The traveled distance $\Delta d$ is divided by the time $\Delta t$ to obtain the aircraft's ground velocity.

The method used to determine the shift $\Delta n$ is a cross-correlation function. For further reference, see K. Castleman, *Digital Image Processing* (1979).

Cross-correlation:

Given two functions f(t) and g(t), their cross-correlation function is given by $$R_{fg}(\tau) = f(t)*g(-t) = \int_{-\infty}^{\infty} f(t)g(t+\tau)dt$$

In a sense, the cross-correlation function indicates the relative amount of agreement between two functions for various degrees of misalignment (shifting).

The function $g(t+\pi)$ is the function $f(t)$ shifted in time by $\pi$. For this preferred embodiment, the function $f(t)$ represents the first contour as the intensity of incident radiant energy as a function of time and the function $g(t+\pi)$ represents the second contour as the intensity of incident radiant energy as a function of time. Thus, the second contour $[g(t+\pi)]$ is the first contour $[f(t)]$ shifted in time by $\pi[\Delta t]$. By multiplying these two functions, $f(t)$ and $g(t+\pi)$, and integrating the product over time, the amount of agreement or similarity between the two contours is obtained.

As shown in the above equation, the rigorous solution of the cross-correlation function is a continuous integral of the products of the two functions $f(t)$ and $g(t+\pi)$. However, a practical digital implementation can be achieved by using the TDC 1009J, a 12 bit multiplier-accumulator made by TRW, P.O. Box 2472, La Jolla, Calif. 92038. First, the digital data stored in memory 30 for the first contour 25 is multiplied (in the TDC 1009J) by the digital data in memory 30 for the second contour 26. In this process, each pixel data point of the first contour 25 (see FIG. 3a) is multiplied by the corresponding pixel data point of the second contour 26 (see FIG. 3b). For example, the pixel data point 1 of the first contour 25 is multiplied by the pixel data point 1 of the second contour 26, the pixel data point 2 of the first contour 25 is multiplied by the pixel data point 2 of the second contour 26, etc. Each contour 25,26 consists of 512 pixel points, and this multiplication process is repeated for each of the 512 corresponding pixel data pairs.

The multiplication of each pixel data pair is done one at a time, beginning with the first pair. The product of the first pixel data pair multiplication is stored in the accumulator of the TDC 1009J. Then the next pair of corresponding pixel data points are multiplied and the product is added to the number stored in the accumulator. After all the products of the 512 pixel data pairs have been added and stored in the accumulator, the magnitude of the number in the accumulator is stored in memory 30. The accumulator is then reset to zero; the data in contour 26 is shifted in time by one pixel; and the multiplication-accumulation process is repeated.

The final number in the accumulator after all 512 pixel data pairs have been multiplied and accumulated can be referred to as the sum of the products of each pixel data pair multiplication. This sum of the products represents the digital integration of the cross-correlation function, which represents the amount of agreement of the data representation of each contour 25,26 (i.e., the degree of similarity between the first contour 25 and the second contour 26). If the two contours were identical, there would be 100% correlation between them. But since the second contour 26 will be shifted in time with respect to the first contour 25 when the integration process begins, the degree of correlation of the first integration will be low. However, as the second contour 26 is incrementally shifted (one pixel at a time) in time with respect to the first contour 25 and the correlation calculation is repeated, the degree of correlation should increase as the two contours become more similar to each other. The number of pixel shifts necessary to achieve 100% correlation between the two contours will yield the value of the contour position shift $\Delta n$.

Figure 4:
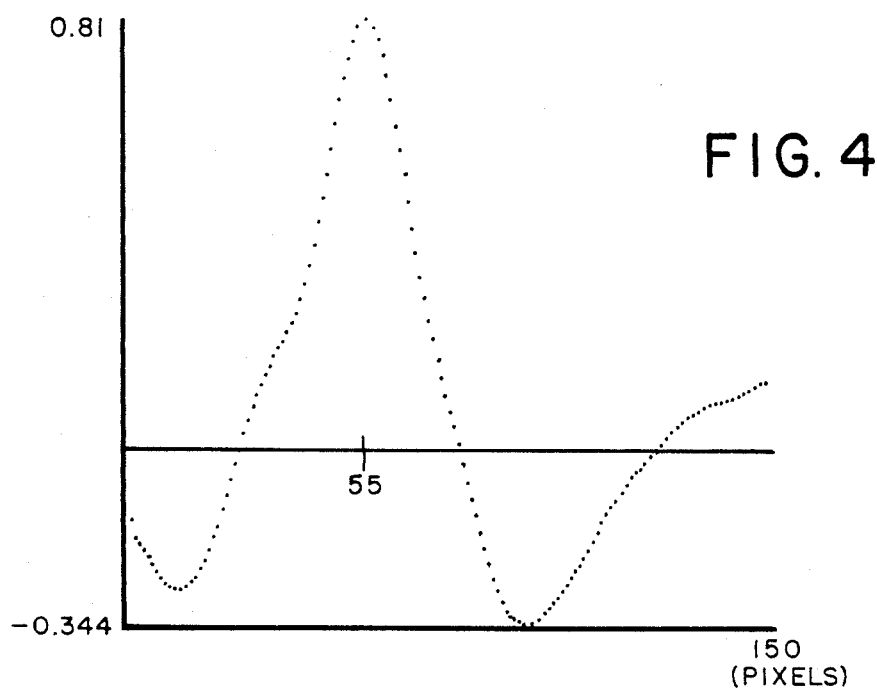
FIG. 4 graphically represents the product-accumulation data which is the result of applying the preferred data processing method to the contours of FIGS. 3a and 3b.

FIG. 4 illustrates the results of repeatedly applying this digital integration of the cross-correlation function to successive orientations of contours 25,26 (FIGS. 3a, 3b). It is shown that the degree of correlation actually decreases for the first few pixel shifts. But as the second contour is shifted additional pixels, the degree of correlation increases as the similarity between the corresponding points of the two contours increases. In this particular case the degree of correlation rises to a maximum of 81% after 55 pixel shifts. After this peak, the degree of correlation expectedly decreases as the two contours begin to shift "out of sync" with each other.

Note that the features of the contours 25,26 in FIG. 3 are not identical. Therefore, it is not possible to obtain 100% correlation between these two contours. In fact, 100% correlation is only attainable in theory. Physical limitations of the components which comprise the invention will preclude the attainment of perfect correlation in practice. However, the point at which the maximum correlation occurs can be used to determine the contour position shift $\Delta n$. That is, the number of pixels shifted to attain the maximum degree of correlation between the first and second contours represents $\Delta n$.

Figure 5:
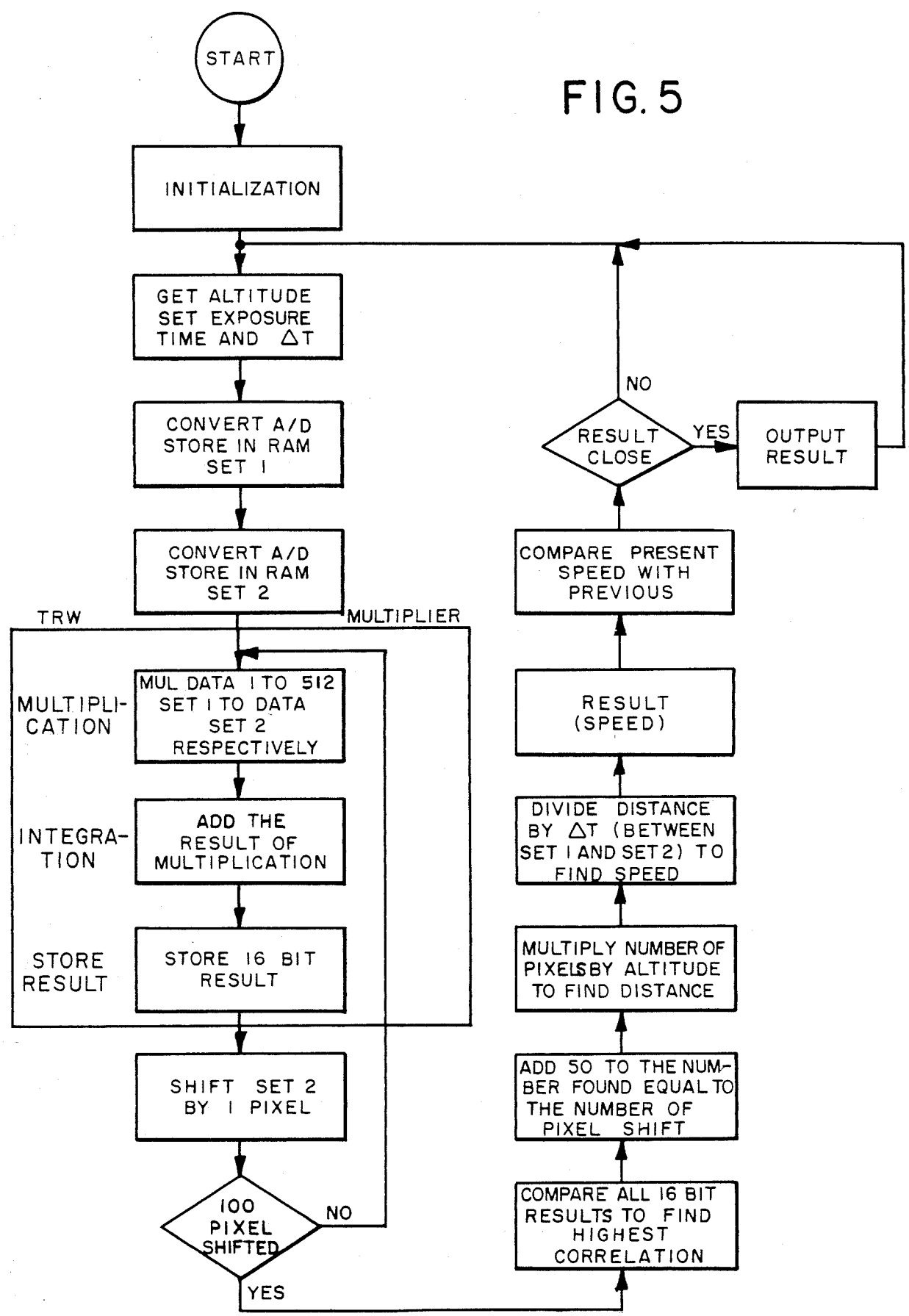
FIG. 5 is a flowchart of the preferred method of determining the ground velocity of an aircraft.

It is a simple matter to examine the final sum of products values stored in memory 30 for the maximum value and to determine the number of pixel shifts necessary to obtain the maximum value (55 in FIG. 4). Obviously, the maximum degree of correlation will not occur at the same number of pixel shifts every time. For accuracy, however, the time delay and exposure controls should be regulated to keep the number of pixel shifts necessary to attain the maximum degree of correlation less than one-third of the total number of pixels, and preferably less than 100 pixel shifts. As shown in FIG. 5, the computer 31 (Z80B) handles the data manipulation except for the product-accumulate function of the TDC 1009J.

The contour position shift $\Delta n$ is proportional to the distance $\Delta d$ traveled by the aircraft 19 in the time interval $\Delta t$ between the formation of the two contours 25,26. To obtain the traveled distance $\Delta d$, the contour postion shift $\Delta n$ must be corrected for the altitude of the aircraft and for the ratio of the focal length of the lens system 12 to the size of the image formed by the CCD sensor 11. The aircraft altitude is determined by the aircraft's altimeter and is input therefrom to the computer 31. The focal length-to-image ratio is a constant, equal to the lens system focal length divided by the length of the row of the CCD sensor's photodetector elements. To make the necessary corrections, the computer 31 multiplies the contour position shift $\Delta n$ by the altitude and divides by the focal length-to-image ratio, thus obtaining the traveled distance $\Delta d$.

The ground velocity of the aircraft is equal to $\Delta d/\Delta t$: the traveled distance divided by the time it took to travel that distance, which is the time delay between the formation of the successive contours 25,26. Since the computer 31 controls the operation of the timing control unit 14, it determines $\Delta t$. Therefore, $\Delta t$ is known. Thus, as the final step in the determination of the aircraft ground velocity the computer 31 divides the traveled distance $\Delta d$ by the time delay $\Delta t$.

The computed aircraft ground velocity is output by the computer 31 as a digital signal. As shown in FIG. 2, the digital signal may be input to a numerical display 36 of the ground speed display unit 15 and to other logic systems of the aircraft (not shown). The digital signal may also be input to a digital-to-analog converter 37 in the signal processing unit 13. The D/A converter 37 converts the ground velocity signal from digital to analog form and outputs it to a display 38 of the ground speed display unit 15 and to other logic systems of the aircraft (not shown). Display 38, for example, may be a dial guage which displays the ground velocity in analog form.

As previously explained, the timing control unit 14 controls the time delay $\Delta t$ to assure that there is overlap between the first and second contours 25, 26. The timing control unit 14 also controls the "exposure" time of the pixels 18 of the CCD sensor 11 to assure that the contour is properly exposed to obtain the sharpest contour which is best suited for contour feature recognition. The timing control unit 14 tries to prevent overexposure and underexposure, both of which can mask features of the contour. The "exposure" time is the period of time during which the pixels 18 are enabled to collect charges in order to form a "snapshot" of a light intensity contour. The exposure control of the timing control unit 14 is responsive to the contour average light intensity, or average mass, calculated by the computer 31 in the Initialization stage of contour processing in FIG. 5 which is shown in greater detail in FIG. 5a.

Figure 5A:
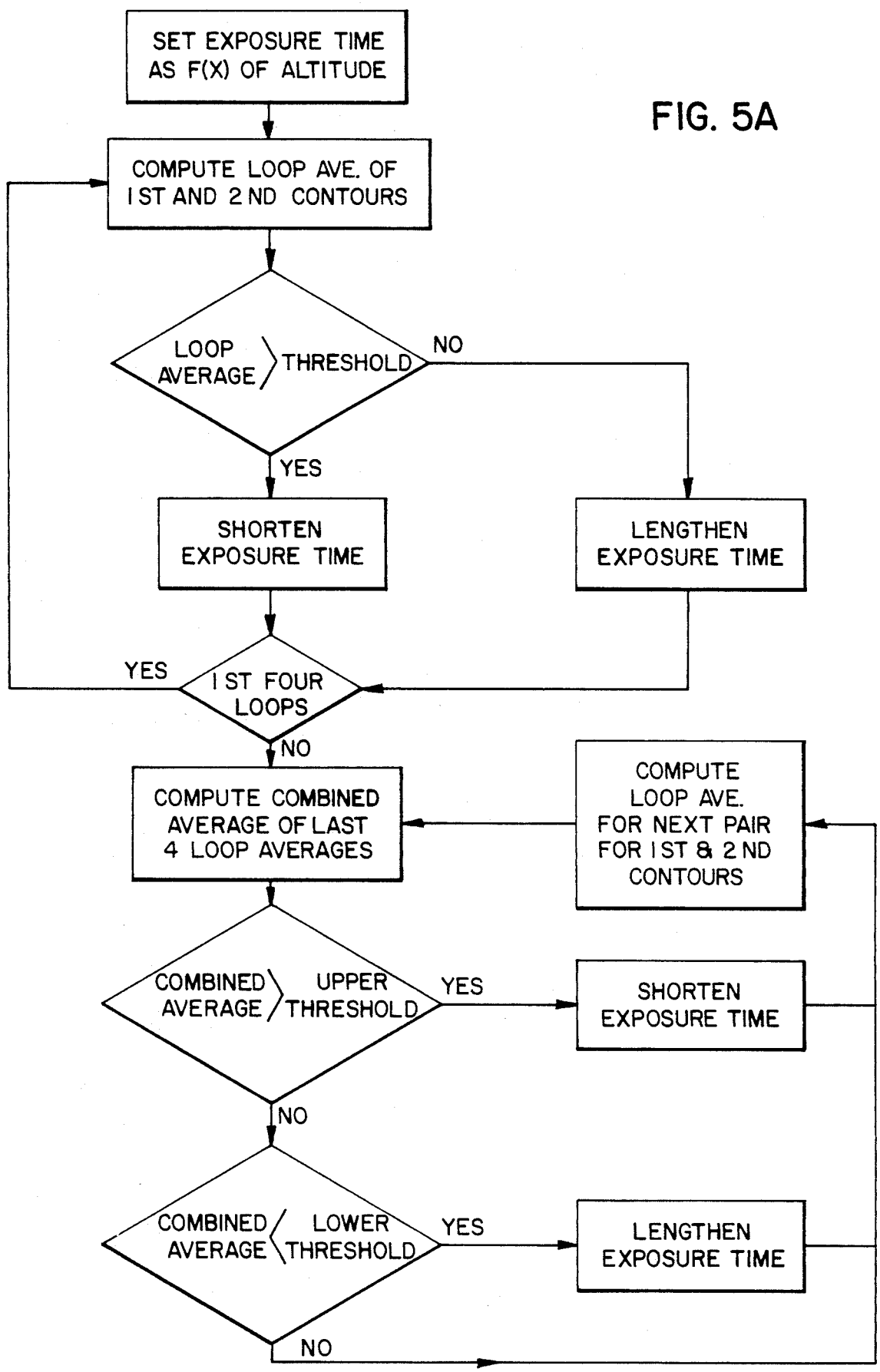
FIG. 5a is a flowchart of a method of controlling the exposure time of the present invention.

Referring now to FIG. 5a, when the system 10 is first activated, or turned on, the exposure control of the timing control unit 14 initializes the CCD sensor 11 operation by setting an initial exposure time as a function of the altitude of the aircraft 19. Short exposure time is set for low altitudes and long exposure time is set for high altitudes. After the initial pair of first and second contours have been formed, their average masses are computed. The signal processing unit 13 then computes the average of these two averages, or loop average, and compares the loop average to an upper threshold. If the loop average exceeds the upper threshold, the timing control unit 14 is commanded to cause the exposure time to be shortened; if the upper threshold is not exceeded, the exposure time is caused to be lengthened. The signal processing unit 13 repeats this procedure for the first three pairs of contours. After the fourth loop average mass has been determined, the signal processing unit 13 computes the combined average of the last four loop average masses, and compares the combined average mass to an upper and a lower threshold. If the combined average mass falls between the thresholds, the exposure time is not changed. If the lower threshold is exceeded, the timing control unit 14 is commanded to lengthen the exposure time, and if the upper threshold is exceeded, the timing control unit 14 is commanded to shorten the exposure time. The signal processing unit 13 continues this mode of operation for subsequent pairs of contours, computing the combined averages from the preceeding four loop averages.

To assure that the exposure time is adjusted for crisp image resolution (i.e., short exposure times at lower altitudes) and to further assure that the time between successive contours $\Delta t$ allows sufficient overlap between the successive contours (i.e., a shorter $\Delta t$ at lower aircraft altitudes) for a reliable and accurate measurement of the contour position shift $\Delta n$, the signal processing unit 13 controls the time delay $\Delta t$ as a function exposure time and aircraft altitude. In response, the timing control unit 14 generates an exposure, readout, reset, exposure, readout, reset, etc. sequence of timing signals, which provides for the repeated generation of light intensity contours and the constant recalculation of the aircraft ground velocity therefrom.

Of course, it should be understood that various changes and modifications to the preferred embodiment described above will be apparent to those skilled in the art. For example, components manufactured by other manufacturers may be utilized to put together the apparatus. The sensor need not be a CCD sensor but may be any suitable photodetector or radiation detector. The photodetector need not be comprised of silicon photodiodes but any type of radiant energy sensitive device. The software may be changed to achieve similar operation in a different manner. For example, the contour position shift $\Delta n$ could be obtained by identifying and isolating a particular feature in both the first and second contours and measuring its relative shift between the contours. Also, the program software will vary with the particular hardware used to make up the system apparatus. Different applications of the system are also feasible. For example, the system may be utilized to determine the speed of a ship, a ground vehicle, or the relative speed of any two objects. These and other changes can be made without departing from the spirit and the scope of the invention, and without diminishing its attendant advantages. It is therefore intended that all such changes and modifications be covered by the following claims.

I claim:

1. Apparatus for determining the ground velocity of an aircraft comprising:
   means for detecting from the aircraft a first radiant energy contour of a first area of the earth's surface and, after a time delay, a second radiant energy contour of a second area of the earth's surface, which second area overlaps in part with the first area;
   means for comparing said first contour with said second contour to produce a position shift signal which represents the relative contour position shift necessary to obtain the maximum degree of correlation between said first contour and said second contour;
   means for producing an altitude correction signal;
   means for multiplying said position shift signal by said altitude correction signal so as to produce a distance signal; and
   means for dividing said distance signal by said time delay to obtain a ground velocity signal of the aircraft.

2. The apparatus of claim 1 further comprising means for focusing radiant energy on said detecting means.

3. The apparatus of claim 2 wherein said focusing means includes means for allowing only light of near infrared wavelengths to be focused on said detecting means.

4. The apparatus of claim 1 wherein said detecting means includes a plurality of radiant energy detection elements and said first contour is detected by a first set of said elements and said second contour is detected by a second set of said elements which are interspersed among said elements of said first set.

5. The apparatus of claim 1 wherein said comparing means comprises:
   means for digitizing said first and second contours;
   means for arranging said first and second digitized contours in an initial orientation with respect to each other and for incrementally shifting said first digitized contour to a plurality of successive positions relative to said second digitized contour;
   means for multiplying the corresponding points of said first and second digitized contours and for summing the products;
   means for storing the sums of the products; and means for identifying the greatest sum obtained over said plurality of successive positions.

6. Apparatus for determining the ground velocity of an aircraft comprising:
- at least one optical image sensor, which includes a plurality of image forming elements, carried by the aircraft;
- means for enabling said elements to form a first optical image of a first area of the earth's surface and, after a time delay, enabling said elements to form a second optical image of a second area of the earth's surface which overlaps in part with said first area;
- means for controlling the length of time said elements are enabled and said time delay;
- means for comparing said first image with said second image to produce a position shift signal representing the relative image position shift necessary to obtain the maximum degree of correlation between said first and second images;
- means for generating an altitude correction signal;
- means for multiplying said position shift signal by said altitude correction signal so as to produce a distance signal; and
- means for dividing said distance signal by said time delay to obtain a signal representing the ground velocity of the aircraft.

7. The apparatus of claim 6 wherein said sensor is a linear image sensor.

8. The apparatus of claim 6 wherein said sensor is rigidly mounted to the aircraft.

9. The apparatus of claim 6 wherein said sensor maintains a constant orientation with respect to the earth's surface.

10. The apparatus of claim 6 further comprising means for focusing an optical image on said sensor.

11. The apparatus of claim 6 further comprising a filtering means which rejects light of wavelengths shorter than near infrared wavelengths as sensed by said optical image sensor.

12. The apparatus of claim 6 wherein said controlling means includes means for setting the time said sensor is enabled as a function of the time delay, the aircraft altitude, and the average intensity of at least one image detected previously.

13. The apparatus of claim 6 wherein said means for controlling the time said elements are enabled includes:
- means for calculating a first and second light average intensity signal of a first and a second image, respectively;
- means for calculating a combined average intensity signal of the average intensity signals of a plurality of images formed previously;
- means for increasing the time said elements are enabled when said combined average intensity signal falls below a first threshold; and
- means for decreasing the time said elements are enabled when said combined average intensity signal exceeds a second threshold.

14. The apparatus of claim 6 wherein said enabling means enables a first set of said elements to form said first image and enables a second set of said elements to form said second image, and said elements of said first set are interspersed amongst said elements of said second set.

15. The apparatus of claim 6 wherein said comparing means comprises:
- means for digitizing said first and second images;
- means for arranging said first and second digitized images in an initial orientation with respect to each other and for incrementally shifting said first digitized image to a plurality of successive positions relative to said second digitized image;
- means for multiplying the corresponding points of said first and second digitized images and for summing the products;
- means for storing the sums of the products; and
- means for identifying the greatest sum obtained over said plurality of successive positions.

16. Apparatus for determining the ground velocity of an aircraft comprising:
- a plurality of light sensitive elements which generate electrical signals in response to incident light;
- means for enabling a first set of said elements to form a first light contour from incident light emitted and reflected from a first area of the earth's surface and, after a time delay, enabling a second set of said elements to form a second light contour from incident light emitted and reflected from a second area of the earth's surface which partially overlaps the first area, said elements of said second set being interspersed among said elements of said first set;
- means for storing said first and second light contours;
- means for comparing said first and second stored light contours to produce a position shift signal representing the relative contour position shift necessary to obtain the maximum degree of correlation between said first and second stored light contours;
- means for generating an altitude correction signal;
- means for multiplying said position shift signal by said altitude correction signal to produce a ground distance signal;
- means for dividing said distance signal by said time delay to obtain an aircraft ground velocity signal.

17. The apparatus of claim 16 wherein said elements are at least two times wider than their length.

18. The apparatus of claim 16 wherein said elements are arranged in a row.

19. The apparatus of claim 18 wherein said first set of elements includes the odd-numbered elements in said row and said second set of elements includes the even-numbered elements in said row.

20. The apparatus of claim 16 further comprising means which reject photons of light shorter than near infrared wavelengths.

21. The apparatus of claim 16 wherein said means for comparing includes:
- means for digitizing said stored first and second light contours;
- means for arranging said first and second digitized contours in an initial orientation with respect to each other and for incrementally shifting said first digitized contour to a plurality of successive positions relative to the second digitized contour;
- means for multiplying the corresponding points of said first and second digitized contours and for summing the products at every corresponding point;
- means for storing said sums; and
- means for identifying the greatest sum obtained over said plurality of successive positions.

22. The apparatus of claim 16 further comprising means for adjusting the time delay to control the degree of overlap of said first and second areas and means for controlling the length of time said elements are enabled.

23. The apparatus of claim 22 wherein said controlling means and said adjusting means cooperate to control the time said elements are enabled and said time delay so that said comparing means obtains the maximum degree of correlation between said first and second contours in less than 150 position shifts.

24. An apparatus for determining the ground velocity of an aircraft comprising:
a sensor which includes a plurality of photodetector pixels, each pixel generating an electrical signal which has its magnitude proportional to the intensity of incident radiant energy;
means for enabling less than all the pixels to generate signals which represent a first light intensity contour of a first area of the earth's surface, and after a time delay, enabling the pixels which do not form part of said first light contour to generate signals which represent a second light intensity contour of a second area of the earth's surface which partially overlaps said first area, wherein said pixels forming said first contour are interspersed among said pixels forming said second contour;
means for adjusting the time delay to control the degree of overlap between said first and second areas;
means for controlling the exposure time of said pixels as a function of the time delay, aircraft altitude, and intensity of a light contour;
means for registering said first and second contours;
means for digitizing the magnitude of the signals representing said first and second contours;
means for storing said first and second digitized contours;
means for arranging said first and second digitized contours in an initial pixel-to-pixel orientation with respect to each other and for incrementally shifting said first digitized contour to a plurality of successive pixel-to-pixel positions relative to said second digitized contour;
means for multiplying the values of the corresponding pixels of said first and second digitized contours and for summing the products of all corresponding pixels of said first and second digitized contours for each orientation of said plurality of positions;
means for storing the sums of said products
means for identifying the greatest sum obtained over said plurality of position shifts;
means for producing a signal representing the number of successive position shifts necessary to obtain said greatest sum;
means for generating an altitude correction signal;
means for multiplying said number of shifts signal by said altitude correction signal to generate a ground distance signal of the aircraft; and
means for dividing said distance signal by said time delay to generate an aircraft ground velocity signal.

25. The apparatus of claim 24 wherein said time controlling means includes:
means for calculating first and second light average intensity signals of a first and a second registered contour, respectively;
means for calculating a loop average intensity signal of said average intensity signals;
means for calculating a combined average intensity signal of a plurality of loop average intensity signals;
means for increasing the exposure time of said photodetector pixels when said combined average intensity signal falls below a first threshold; and
means for decreasing the exposure time of said photodetector pixels when said combined average intensity signal exceeds said second threshold.

26. The apparatus in claim 24 wherein said photodetector pixels are two to twenty-five times wider than their length.

27. A method for determining the ground velocity of an aircraft comprising:
detecting from the aircraft a radiant energy contour of a first area of the earth's surface;
after a time delay, detecting from the aircraft a radiant energy contour of a second area of the earth's surface which partially overlaps the first area;
comparing the first contour with the second contour to produce a signal representing the relative contour position shift necessary to obtain the maximum degree of correlation between the first and second contours;
producing an altitude correction signal;
multiplying the contour position shift signal by the altitude correction signal to produce a distance signal; and
dividing the distance signal by the time delay to generate a ground velocity signal.

28. A method for determining the ground velocity of an aircraft comprising:
enabling a first set of photosensors mounted on the aircraft to form a first light intensity contour in response to light emitted and reflected from a first area of the earth's surface;
after a time delay, enabling a second set of photosensors mounted on the aircraft to form a second light intensity contour in response to light emitted and reflected from a second area of the earth's surface which partially overlaps the first area;
adjusting the time delay to control the degree of overlap of the first and second areas;
controlling the time the photosensors are enabled as a function of the time delay, aircraft altitude, and average intensity of a previously formed contour;
comparing the first and second contours to produce a signal representing the relative contour position shift necessary to attain the maximum degree of correlation between the first and second contours;
generating an altitude correction signal;
multiplying the relative contour shift signal by the altitude correction signal to produce a ground distance signal; and
dividing the ground distance signal by the time delay to generate a ground velocity signal.

29. The method of claim 28 wherein the time controlling step includes:
calculating first and second average intensity signals of a first and a second contour, respectively;
calculating a combined average intensity signal of the average intensity signals of a plurality of contours previously formed;
increasing the time the photosensors are enabled when the combined average intensity signal falls below a first threshold; and
decreasing the time the photosensors are enabled when the combined average intensity signal exceeds a second threshold.

30. The method of claim 28 wherein the comparing step includes:

storing the first and second contours;
digitizing the first and second stored contours;
arranging the first and second digitized contours in an initial orientation with respect to each other and incrementally shifting the first digitized contour to a plurality of successive positions relative to the second digitized contour;

multiplying the corresponding points of the first and second digitized contours and summing the products at every corresponding point;
storing the sums; and
identifying the greatest sum of the products obtained over the plurality of successive positions.

31. The method of claim 28 further comprising the step of filtering wavelengths of light shorter than near infrared wavelengths.

* * * * *

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

IN THE REFERENCES CITED
U.S. PATENT DOCUMENTS

Patent No. 3,545,268 please delete "Von Struve" and substitute therefor --Von Struve III--;

IN THE DETAILED DESCRIPTION
OF THE PREFERRED EMBODIMENT

In column 7, line 1, please delete "(t+$\eta$)" and substitute therefor --(t+$\tau$)--;

In column 7, line 2, please delete "$\eta$" and substitute therefor --$\tau$--;

In column 7, line 5, please delete "(t+$\eta$)" and substitute therefor --(t+$\tau$)--;

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

In column 7, line 7, please delete "$[g(t+\eta)]$" and substitute therefor --$[g(t+\tau)]$--;

In column 7, line 8, please delete "$\eta$" and substitute therefor --$\tau$--;

In column 7, line 9, please delete "$g(t+\eta)$," and substitute therefor --$g(t+\tau)$,--;

In column 7, line 14, please delete "$g(t+\eta)$" and substitute therefor --$g(t+\tau)$--;

IN THE CLAIMS

In claim 24 (column 13, line 46), please add a --;-- after the word "products".

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

```
'EKTRONIX      Z80 ASM V3.3                              PAGE    1

00001                ;               1. INITIALIZATION
00002                ;               ****************

00004    0000        ;         ORG       00

00006  0000 31201C             LD        SP,STACKPNT    ; LOAD THE STACKPOINTER 00008  0003 3E02                LD        A,2            ; INITIAL DELTAT IS 2 MSEC
00009  0005 32211C              LD        (DELTAT),A
00010  0008 3ECB                LD        A,0CBH         ; INITIAL DELTIME IS 202
00011  000A 32221C              LD        (DELTIME),A
00012  000D 3E04                LD        A,4            ; INITIAL EXPOSURE IS 4 MSEC
00013  000F 32241C              LD        (EXPTIMEN),A 00015  0012 3E37                LD        A,37H          ; TIMER MODE, DIVIDE SYSTEM CLOCK BY 256
00016  0014 D307                OUT       (CTC1CH0),A    ; FOR CTC1 CHANNEL 0
00017  0016 3E0A                LD        A,0AH          ; TIME CONSTANT WORD TO GIVE
00018  0018 D307                OUT       (CTC1CH0),A    ; 1024 MSEC OUTPUT FOR CTC1 CHANNEL 0

00020  001A 3E64                LD        A,100          ; SET INITIAL SHIFT
00021  001C 32201C              LD        (SHIFT),A 00023  001F 212A03               LD        HL,810         ; SET INITIAL DELAY
00024  0022 22271C               LD        (DELAYN),HL
00025  0025 FD21291C             LD        IY,FLAGBYTE    ; STORE THE ADDRESS OF ALL FLAGS
00026  0029 FDAE00               XOR       (IY+0)         ; RESET ALL FLAGS
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX      Z80 ASM V3.3                              PAGE   2

00028         ;                    5A. INTERUPT SERVICE ROUTINE
00029         ;                    ********************************

00031   0038  )             ORG    38H 00033 0038 08               EX     AF,AF        ; SAVE CONTENTS OF ALL REGISTERS
00034 0039 D9               EXX 00036 003A FDCB0076         BIT    6,(IY+0)     ; CHECK FLAG F7
00037 003E 2804             JR     Z,CONTINUE   ; IF RESET CONTINUE
00038 0040 3EFF             LD     A,0FFH       ; OTHERWISE DISABLE RAM2
00039 0042 D309             OUT    (RAMENABL),A 00041 0044 FDCB005E CONTINUE BIT   3,(IY+0)     ; CHECK FLAG F4
00042 0048 2006             JR     NZ,GOBACK    ; IF SET RETURN TO WHERE INTERUPT OCCURED
00043 004A 2A2B1C           LD     HL,(INTERDIR) ; OTHERWISE GET THE ADDRESS WHERE TO GO
00044 004D 33               INC    SP           ; RESTORE THE RIGHT STACKPOINTER
00045 004E 33               INC    SP
00046 004F E5               PUSH   HL           ; LOAD THE ADDRESS TO GO IN THE STACK AS IF
00047                                           ; INTERUPT OCCURED THERE 00049 0050 08      GOBACK   EX     AF,AF        ; RESTORE CONTENTS OF ALL REGISTERS
00050 0051 D9               EXX
00051 0052 ED4D             RETI                ; RETURN FROM INTERUPT
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX       Z80 ASM V3.3                          PAGE    3

00053                 ;           3. RESET AND SET THE COUNTERS FOR BOTH SETS
00054                 ;           ***********************************************

00056   0064                      ORG     100

00058 0064 3E17    NEWEXSET  LD      A,17H          ; DIVIDE SYSTEM CLOCK BY 16
00059 0066 D317              OUT     (CTC1CH1),A    ; FOR CTC1 CHANNEL 1
00060 0068 3E02              LD      A,2            ; SET 12.8 USEC OUTPUT PERIOD
00061 006A D317              OUT     (CTC1CH1),A    ; FOR CTC1 CHANNEL 1

00063 006C 3E58              LD      A,58H          ; RESET CHANNEL WITHOUT LOADING TIME REGISTER WORD
00064 006E D318              OUT     (CTC2CH1),A    ; FOR CTC2 CHANNEL 1

00066 0070 3E5F              LD      A,5FH          ; RESET CHANNEL WITH FOLLOWING TIME REGISTER WORD
00067 0072 D328              OUT     (CTC2CH2),A    ; FOR CTC2 CHANNEL 2
00068 0074 D317              OUT     (CTC1CH1),A    ; FOR CTC1 CHANNEL 1

00070 0076 3A211C            LD      A,(DELTAT)     ; GET DELTAT
00071 0079 47                LD      B,A            ; STORE IT IN REGISTER B 00073 007A 3A241C            LD      A,(EXPTIMEN)   ; GET EXPOSURE
00074 007D D317              OUT     (CTC1CH1),A    ; TIME REGISTER WORD FOR CTC1 CHANNEL 1
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00076 007F 3E9B    LOOP1    LD      A,9BH              ; NUMBER OF INSIDE LOOPS
00077 0081 4F               LD      C,A                ; MAKE REGISTER C A COUNTER
00078 0082 0D      LOOP2    DEC     C                  ; DECREMENT THE COUNTER
00079 0083 20FD             JR      NZ,LOOP2           ; LOOP 9B TIMES, EQUALS 1 MSEC
00080 0085 10F8             DJNZ    LOOP1              ; LOOP DELTAT TIMES 00082 0087 3E17             LD      A,17H              ; DIVIDE SYSTEM CLOCK BY 16
00083 0089 D318             OUT     (CTC2CH1),A        ; FOR CTC2 CHANNEL 1
00084 008B 3E01             LD      A,1H               ; SET 6.4 USEC OUTPUT PERIOD
00085 008D D318             OUT     (CTC2CH1),A        ; FOR CTC2 CHANNEL 1

00087 008F 3E5F             LD      A,5FH              ; RESET CHANNEL WITH FOLLOWING TIME REGISTER WORD
00088 0091 D318             OUT     (CTC2CH1),A        ; FOR CTC2 CHANNEL 1

00090 0093 3A241C           LD      A,(EXPTIMEN)       ; GET EXPOSURE
00091 0096 D318             OUT     (CTC2CH1),A        ; TIME REGISTER WORD FOR CTC2 CHANNEL 1

00093 0098 3A221C           LD      A,(DELTIME)        ; GET DELTIME
00094 009B D328             OUT     (CTC2CH2),A        ; TIME REGISTER WORD FOR CTC2 CHANNEL 2
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX        Z80 ASM V3.3                            PAGE    4

00096              ;                    4. CHECKING FLAGS F1 AND F2
00097              ;                    ******************************

00099 009D FDCB0046           BIT    0,(IY+0)     ; FLAG F1
00100 00A1 2804               JR     Z,STORESET   ; IF RESET THEN STORE BOTH SETS
00101 00A3 FDCB004E           BIT    1,(IY+0)     ; FLAG F2
00102 00A7 CA4002 )           JP     Z,CORRELX    ; IF RESET THEN DO THE CORRELATIONS
00103 00AA C30301 )           JP     CONVERTX     ; OTHERWISE CONVERT SHIFT TO SPEED

TEKTRONIX        Z80 ASM V3.3                            PAGE    5

00105              ;                    *5. CHANGE FROM OLD TO NEW PARAMETERS
00106              ;                    ************************************

00108 00AD 3A241C  STORESET   LD     A,(EXPTIMEN) ; GET EXPOSURE LOADED IN COUNTERS
00109 00B0 32231C             LD     (EXPTIMEC),A ; STORE IT FOR CALCULATIONS 00111 00B3 2A271C             LD     HL,(DELAYN)  ; GET DELAY USED FOR THE COUNTERS
00112 00B6 22251C             LD     (DELAYC),HL  ; STORE IT FOR CALCULATIONS
```

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

```
TEKTRONIX        Z80 ASM V3.3                                    PAGE    6

00114             ;                    5. STORING BOTH SETS AND AVERAGING SET 1
00115             ;                    ************************************

00117 00B9 3EF3              LD       A,0F3H         ; ENABLE RAM1
00118 00BB D300              OUT      (RAMENABL),A 00120 00BD 21C700            LD       HL,GETSET2     ; STORE WHERE TO GO AFTER INTERUPT
00121 00C0 2228IC            LD       (INTERDIR),HL 00123 00C3 FB                EI                      ; ENABLE INTERUPT
00124 00C4 ED56               IM      1              ; SET MODE 1
00125 00C6 76                HALT                    ; WAIT FOR INTERUPT
00126 00C7 3EFF     GETSET2  LD       A,0FFH         ; DISABLE RAM1
00127 00C9 D300              OUT      (RAMENABL),A 00129 00CB D302              OUT      (ALTIMET),A    ; START ALTITUDE CONVERSION 00131 00CD 3EEB              LD       A,0EBH         ; ENABLE RAM2
00132 00CF D300              OUT      (RAMENABL),A
```

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

```
00134 00D1 21F500  )         LD      HL,ALLSTORD     ; STORE WHERE TO GO AFTER INTERUPT
00135 00D4 2222B1C            LD      (INTERDIR),HL 00137 00D7 FB                 EI                      ; ENABLE INTERUPT
00138 00D8 ED56               IM      1               ; SET MODE 1
00139 00DA FDCB00F6           SET     6,(IY+0)        ; SET FLAG F7
00140 00DE FDCB00DE           SET     3,(IY+0)        ; SET FLAG F4

00142 00E2 21FF0F             LD      HL,RAM1-1       ; ADDRESS OF THE BEGINNING OF SET1-1
00143 00E5 CDB602 )           CALL    AVERAGEX        ; CALCULATE THE AVERAGE OF SET1
00144 00E8 32A1C              LD      (AVERSET1),A    ; SAVE AVERAGE 00146 00EB FDCB009E           RES     3,(IY+0)        ; RESET FLAG F4

00148 00EF ED57               LD      A,I             ; AFTER THIS PARITY FLAG WILL CONTAIN IF2
00149 00F1 EAF500  )          JP      PE,ALLSTORD     ; IF INTERUPT OCCURED (IF2=0, PARITY EVEN)
                                                              THEN CONTINUE
   00150 00F4 76                      HALT            ; OTHERWISE WAIT FOR INTERUPT 00152 00F5 FDCB00B6  ALLSTORD  RES    6,(IY+0)     ; RESET FLAG F7
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX        Z80 ASM V3.3                              PAGE    7

00154                   ;              8.9.10.11. CAN WE WORK WITH THE SIGNAL?
00155                   ;              ***********************************

00157 00F9 3A2A1C              LD      A,(AVERSET1)    ; GET THE AVERAGE OF SET1
00158 00FC FEE5                CP      0E5H            ; IF AVERAGE IS GREATER OR EQUAL THAN 90% OF MAXIMUM
00159 00FE 3017                JR      NC,EXPTIMEX     ; WE CANNOT WORK WITH IT 00161 0100 FE1A                CP      1AH             ; IF AVERAGE IS LESS OR EQUAL THAN 10% OF MAXIMUM
00162 0102 3813                JR      C,EXPTIMEX      ; WE CANNOT WORK WITH IT 00164 0104 FDCB00C6            SET     0,(IY+0)        ; SET FLAG F1

00166 0108 FECC                CP      0CCH            ; IF AVERAGE IS GREATER OR EQUAL THAN 80% OF MAXIMUM
00167 010A 300B                JR      NC,EXPTIMEX     ; FIND CORRECT EXPOSURE 00169 010C FE34                CP      34H             ; IF AVERAGE IS LESS OR EQUAL THAN 20% OF MAXIMUM
00170 010E 3807                JR      C,EXPTIMEX      ; FIND CORRECT EXPOSURE 00172 0110 FDCB00D6            SET     2,(IY+0)        ; OTHERWISE SET FLAG F3
00173 0114 C34002              JP      CORRELX         ; GO AND DO CORRELATIONS
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX        Z80 ASM V3.3                              PAGE   8

00175        ;              . 12. FIND CORRECT EXPOSURE TIME
00176        ;                ******************************

00178 0117 2A231C   EXPTIMEX   LD    HL,(EXPTIMEC)  ; GET LAST EXPOSURE
00179 011A AC                  XOR   H              ; CLEAR REGISTER H
00180 011B 0606                LD    B,6            ; SET THE COUNTER
00181 011D CB25     EXPTIME1   SLA   L              ; MULTIPLY EXPOSURE BY DESIRED AVERAGE=80H
00182 011F CB14                RL    H              ; BY SHIFTING LEFT 6 TIMES
00183 0121 10FA                DJNZ  EXPTIME1       ; LOOP 6 TIMES 00185 0123 3A2A1C              LD    A,(AVERSET1)   ; DIVIDE RESULT BY AVERAGE
00186 0126 5F                  LD    E,A
00187 0127 CD0202              CALL  DIVIDB16       ; DIVIDE 16 BITS BY 8 BITS 00189 012A 7C       EXPTIME7   LD    A,H            ; GET HIGHER BYTE OF EXPOSURE
00190 012B FE00                CP    0              ; COMPARE IT WITH 0
00191 012D 2020                JR    NZ,EXPTIME2    ; IF IT IS NOT 0 THEN CHECK FLAG F5
00192 012F 7D                  LD    A,L            ; OTHERWISE COMPARE LOWER BYTE
00193 0130 FE80                CP    128            ; WITH 128 (MAXIMUM EXPOSURE 127 MSEC)
00194 0132 302B                JR    NC,EXPTIME2    ; IF IT IS GREATER THAN 127 CHECK FLAG F5

00196 0134 FE04                CP    4              ; OTHERWISE COMPARE IT WITH 4 MSEC
00197 0136 3013                JR    NC,EXPTIME3    ; IF GREATER OR EQUAL RESET INDICATORS 00199 0138 FDCB0066            BIT   4,(IY+0)       ; CHECK FLAG F5
00200 013C 2815                JR    Z,EXPTIME4     ; IF RESET IT IS OVEREXPOSURE
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00202 013E 3E01                 LD      A,1H            ; OTHERWISE STOP DOWN THE LENS
00203 0140 D30C                 OUT     (APERTURE),A 00205 0142 FDCB00A6             RES     4,(IY+0)        ; RESET FLAG F5

00207 0146 1E16                 LD      E,22            ; MULTIFLY EXPOSURE BY 22 (SAME AS OPENNING
00208                                                   ; THE LENS FROM 1.2 TO 5.6)
00209 0148 CD2E03 )             CALL    MULTIP88        ; MULTIPLIES 8 BITS BY 8 BITS 00211 014B AF        EXPTIME3   XOR     A               ; RESET OVER AND UNDEREXPOSURE
00212 014C D30A                 OUT     (OVEREXP),A     ; INDICATORS
00213 014E D30B                 OUT     (UNDEREXP),A
00214 0150 C37701 )             JP      EXPTIME5        ; EVERYTHING IS SET 00216 0153 2E04      EXPTIME4   LD      L,4             ; MAKE EXPOSURE 4 MSEC
00217 0155 3E01                 LD      A,1H            ; INDICATE OVEREXPOSURE
00218 0157 D30A                 OUT     (OVEREXP),A
00219 0159 C37701 )             JP      EXPTIME5        ; EVERYTHING IS SET 00221 015C FDCB0066 EXPTIME2    BIT     4,(IY+0)        ; CHECK FLAG F5
00222 0160 200F                 JR      NZ,EXPTIME4     ; IF IT IS SET MAKE EXPOSURE 127 MSEC 00224 0162 AF                   XOR     A               ; OTHERWISE OPEN THE LENS
00225 0163 D30C                 OUT     (APERTURE),A
```

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

```
TEKTRONIX        Z80 ASM V3.3                                PAGE    9

00227 0165 FDCB00E6           SET     4,(IY+0)        ; SET FLAG F5

00229 0169 1E16               LD      E,22            ; DIVIDE EXPOSURE BY 22
00230 016B CD0202 )           CALL    DIVID816        ; DIVIDE 16 BITS BY 8 BITS
00231 016E C32A01 )           JP      EXPTIME7        ; CHECK EXPOSURE AGAIN 00233 0171 2E7F    EXPTIME6   LD      L,127           ; MAKE EXPOSURE 127 MSEC
00234 0173 3E01               LD      A,1H            ; INDICATE UNDEREXPOSURE
00235 0175 D30B               OUT     (UNDEREXP),A 00237 0177 7D      EXPTIME5   LD      A,L             ; STORE RESULTANT EXPOSURE
00238 0178 32241C             LD      (EXPTIMEN),A
```

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

```
TEKTRONIX      Z80 ASM V3.3                              PAGE    10

00240                ;           13. FIND NEW DELAY
00241                ;           *******************

00243 0178 2A251C    DELAYX  LD    HL,(DELAYC)   ; MULTIPLY USED DELAY BY THE SHIFT
00244 017E 116400            LD    DE,100        ; WE WANT=100
00245 0181 CD4103 )          CALL  MULTIP81      ; MULTIPLY 16 BITS BY 8 BITS
00246 0184 5F               LD    E,A           ; STORE MSB OF RESULT IN REGISTER E
00247 0185 AA               XOR   D             ; CLEAR REGISTER D
00248 0186 D5               PUSH  DE            ; RELOAD MSB IN IX
00249 0187 DDE1             POP   IX 00251 0189 3A2D1C           LD    A,(SHIFT)     ; DIVIDE THE RESULT BY SHIFT WE GOT
00252 018C 5F               LD    E,A           ; PUT IT IN REGISTER E
00253 018D CDF202 )         CALL  DIVID163      ; DIVIDE 32 BITS BY 16 BITS
00254 0190 E5               PUSH  HL            ; SAVE THE RESULT 00256 0191 ED5B241C         LD    DE,(EXPTIMEN) ; GET EXPOSURE
00257 0195 AA               XOR   D             ; CLEAR REGISTER D
00258 0196 A8               XOR   B             ; CLEAR THE COUNTER
00259 0197 A9               XOR   C 00261 0198 ED52    DELAY1   SBC   HL,DE         ; SUBTRACT EXPOSURE FROM DELAY
00262 019A 03               INC   BC            ; INCREMENT THE COUNTER
00263 019B 30FB             JR    NC,DELAY1     ; IF NO CARRY THEN CONTINUE THE LOOP
00264 019D ED5A             ADC   HL,DE         ; OTHERWISE RESTORE LAST HL (REMAINDER)
00265 019F ED43221C         LD    (DELTIME),BC  ; PUT COUNTER IN DELTIME
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00267 01A3 EB                      EX      DE,HL           ; PUT REMAINDER IN DE
00268 01A4 E1                      POP     HL              ; GET DELAY
00269 01A5 ED52                    SBC     HL,DE           ; SUBTRACT REMAINDER FROM DELAY
00270 01A7 E5                      PUSH    HL              ; STORE IT IN BC
00271 01A8 C1                      POP     BC
00272 01A9 EB                      EX      DE,HL           ; PUT REMAINDER BACK IN HL 00274 01AA 3E01                    LD      A,1             ; COMPARE REMAINDER WITH 2
00275 01AC 95                      SUB     L
00276 01AD 3805                    JR      C,DELAY2        ; IF IT IS GREATER THAN OR EQUAL 2 THEN
                                                             COMPARE IT WITH EXPOSUR 00277 01AF 3C                      INC     A               ; OTHERWISE SEE HOW MUCH WE HAVE TO ADD
00278 01B0 85                      ADD     A,L             ; GET NEW DELTAT
00279 01B1 C3BE01                  JP      DELAY5          ; GO TO STORE IT 00281 01B4 3A241C    DELAY2        LD      A,(EXPTIMEN)    ; GET EXPOSURE
00282 01B7 95                      SUB     L               ; SUBTRACT THE REMAINDER
00283 01B8 FE01                    CP      1               ; COMPARE THE DIFFERENCE WITH 1
00284 01BA 2001                    JR      NZ,DELAY4       ; IF IT IS 2 OR GREATER IT IS OK
00285 01BC 2D                      DEC     L               ; OTHERWISE DECREMENT THE REMAINDER
00286 01BD 7D        DELAY4        LD      A,L             ; PUT IT IN REGISTER A 00288 01BE 32211C    DELAY5        LD      (DELTAT),A      ; STORE DELTAT
00289 01C1 09                      ADD     HL,BC           ; CORRECT THE DELAY
00290 01C2 22271C                  LD      (DELAYN),HL     ; AND STORE IT
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX       Z80 ASM V3.3                           PAGE   11

00292                ;            15. CHECKING FLAGS
00293                ;            *******************

00295 01C5 FDCB004E       BIT    1,(IY+0)      ; CHECK FLAG F2
00296 01C9 CA6400  )      JP     Z,NEWEXSET    ; RESET AND SET COUNTERS
00297 01CC FDCB0056       BIT    2,(IY+0)      ; CHECK FLAG F3
00298 01D0 C26400  )      JP     NZ,NEWEXSET   ; RESET AND SET COUNTERS
00299                                          ; OTHERWISE CONVERT SHIFT TO SPEED
```

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

```
TEKTRONIX        Z80 ASM V3.3                                PAGE   12

00301            ;                  16. CONVERT SHIFT TO SPEED
00302            ;                  ****************************

00304 0103 3A2D1C   CONVERTX   LD     A,(SHIFT)     ; GET THE SHIFT FROM CORRELATION
00305 0106 AC                  XOR    H             ; CLEAR REGISTER H
00306 0107 CB27                SLA    A             ; MULTIPLY SHIFT BY 2
00307 0109 C601                ADD    A,1           ; ADD 1
00308 010B 6F                  LD     L,A           ; PUT THE RESULT IN REGISTER HL
00309 010C CB14                RL     H             ; CARRY IS SHIFTED IN H
00310 010E E5                  PUSH   HL            ; SAVE RESULT IN DE
00311 010F D1                  POP    DE 00313 01E0 0607                LD     B,7           ; SET THE COUNTER
00314 01E2 CB25     CONVERT1   SLA    L             ; MULTIPLY HL BY 80H
00315 01E4 CB14                RL     H
00316 01E6 10FA                DJNZ   CONVERT1

00318 01E9 ED52                SBC    HL,DE         ; SUBTRACT SAVED RESULT (EQUALS
                                                     MULTIPLICATION BY 7FH)
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00320 01EA 1EFA            LD     E,250         ; DIVIDE RESULT BY 250
00321 01EC CDD202 )        CALL   DIVID816      ; DIVIDE 16 BITS BY 8 BITS 00323 01EF 3A931C          LD     A,(ALTITLSB)  ; TRANSFER LSB OF ALTITUDE TO REGISTER A
00324 01F2 5F              LD     E,A           ; STORE IT IN REGISTER E
00325 01F3 3A941C          LD     A,(ALTITMSB)  ; TRANSFER MSB OF ALTITUDE TO REGISTER A
00326 01F6 57              LD     D,A           ; STORE IT IN REGISTER D 00328 01F7 EB              EX     DE,HL         ; EXCHANGE REGISTERS HL AND DE
00329 01F8 CD4103 )        CALL   MULTIP81      ; MULTIPLY 16 BITS BY 8 BITS 00331 01FB 5F              LD     E,A           ; RELOAD REGISTER A IN REGISTER IX
00332 01FC AA              XOR    D
00333 01FD D5              PUSH   DE
00334 01FE DDE1            POP    IX
00335 0200 ED5B251C        LD     DE,(DELAYC)   ; DIVIDE THE RESULT BY DELAY
00336 0204 CDF202 )        CALL   DIVID163      ; DIVIDE 32 BITS BY 16 BITS
00337 0207 22951C          LD     (SPEED),HL    ; STORE THE SPEED
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX      Z80 ASM V3.3                            PAGE   13

00339              ;                   16A. CONVERT SPEED TO DECIMAL AND DISPLAY THE RESULTS
00340              ;                   **********************************************

00342 020A 1E64           LD     E,100         ; DIVIDE SPEED BY 100
00343 020C CD0202 )       CALL   DIVID816      ; DIVIDE 16 BITS BY 8 BITS
00344 020F 5D             LD     E,L           ; PUT THE RESULT IN REGISTER E 00346 0210 7D             LD     A,L           ; AND IN A
00347 0211 D305           OUT    (DIGIT3),A    ; DISPLAY THIRD DIGIT 00349 0213 216400         LD     HL,100        ; MULTIPLY THE RESULT BY 100
00350 0216 CD2E03 )       CALL   MULTIP88      ; MULTIPLY 8 BITS BY 8 BITS
00351 0219 EB             EX     DE,HL         ; RELOAD RESULT IN DE 00353 021A 2A951C         LD     HL,(SPEED)    ; GET SPEED
00354 021D AF             XOR    A             ; CLEAR THE CARRY FLAG
00355 021E ED52         - SBC    HL,DE         ; SUBTRACT HUNDREDS FROM SPEED
00356 0220 E5             PUSH   HL            ; SAVE THE DIFFERENCE
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00358 0221 1E0A           LD      E,10         ; DIVIDE THE DIFFERENCE BY 10
00359 0223 CDDE02 )       CALL    DIVID88      ; DIVIDE 8 BITS BY 8 BITS
00360 0226 5D             LD      E,L          ; PUT THE RESULT IN E
00361 0227 7D             LD      A,L          ; AND IN A 00363 0228 D304           OUT     (DIGIT2),A   ; DISPLAY SECOND DIGIT 00365 022A 210A00         LD      HL,10        ; MULTIPLY THE RESULT BY 10
00366 022D CD2E03 )       CALL    MULTIP88     ; MULTIPLY 8 BITS BY 8 BITS 00368 0230 D1             POP     DE           ; GET THE DIFFERENCE
00369 0231 7B             LD      A,E          ; PUT IT IN A
00370 0232 95             SUB     L            ; SUBTRACT THE RESULT OF MULTIPLICATION 00372 0233 D303           OUT     (DIGIT1),A   ; DISPLAY FIRST DIGIT
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX      Z80 ASM V3.3                                PAGE   14

00374              ;              17. RESET FLAGS
00375              ;              ***************

00377 0235 3A271C           LD      A,(FLAGBYTE)    ; GET FLAGS
00378 0238 E6F8             AND     0F8H            ; RESET LAST 3 BITS, LEAVE OTHER UNCHANGED
00379 023A 32271C           LD      (FLAGBYTE),A    ; STORE FLAGS 00381 023D C3AD00           JP      STORESET        ; GO TO STORE NEW SETS
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX         Z80 ASM V3.3                              Page   15

00383             ;                    7. DO CORRELATIONS AND FIND MAXIMUM CORRELATION
00384             ;                    ****************************************

00386 0240 0632   CORRELX    LD     B,50           ; PRESET THE COUNTER
00387 0242 AA                XOR    D              ; CLEAR DE REGISTER
00388 0243 AB                XOR    E
00389 0244 217D02 )          LD     HL,CORREL4     ; WHERE TO GO AFTER INTERUPT
00390 0247 2228lC            LD     (INTERDIR),HL  ; STORE IT
00391 024A AC                XOR    H              ; CLEAR HL REGISTER
00392 024B AD                XOR    L 00394 024C 3EFB              LD     A,0FBH         ; ENABLE RAMS
00395 024E D300              OUT    (RAMENABL),A 00397 0250 3EFA              LD     A,0FAH         ; ENABLE COUNTING
00398 0252 D300              OUT    (RAMENABL),A 00400 0254 78     CORREL5    LD     A,B            ; GET THE COUNTER
00401 0255 FE96              CP     150            ; CHECK THE COUNTER
00402 0257 282F              JR     Z,CORREL3      ; IF ALL CORRELATIONS ARE DONE THEN GET OUT 00404 0259 D306              OUT    (COUNTER),A    ; SET THE HARDWARE COUNTER
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00406 025B D30A                 OUT     (MULTACC),A     ; START MULTIPLIER-ACCUMULATOR 00408 025D 222E1C               LD      (RESULTMU),HL   ; SAVE THE RESULT OF LAST CORRELATION
00409 0260 AF                   XOR     A               ; CLEAR CARRY FLAG
00410 0261 ED52                 SBC     HL,DE           ; COMPARE IT WITH THE BIGGEST ONE
00411 0263 3811                 JR      C,CORREL1       ; NEW ONE IS SMALLER
00412 0265 2809                 JR      Z,CORREL2       ; NEW ONE IS EQUAL 00414 0267 ED592E1C             LD      DE,(RESULTMU)   ; OTHERWISE IT IS GREATER, PUT IT IN DE
00415 026B DD212E1C             LD      IX,SHIFTPR-1    ; GET THE ADDRESS-1 FOR STORING THE SHIFT
00416 026F A9                   XOR     C               ; SET THE REPEAT COUNTER 00418 0270 DD23     CORREL2     INC     IX              ; INCREMENT THE ADDRESS
00419 0272 0C                   INC     C               ; INCREMENT THE REPEAT COUNTER
00420 0273 DD7000               LD      (IX+0),B        ; STORE THE SHIFT 00422 0276 04       CORREL1     INC     B               ; INCREMENT THE COUNTER 00424 0277 FB                   EI                      ; ENABLE INTERUPT
00425 0278 ED56                 IM      1               ; MODE 1
00426 027A 3E01                 LD      A,1             ; WILL BE USED AFTER INTERUPT
00427 027C 76                   HALT                    ; WAIT FOR INTERUPT 00429 027D D301     CORREL4     OUT     (RESULTTR),A    ; TRANSFER DATA TO THE OUTPUT OF M-A 00431 027F DB01                 IN      A,(RESULTMB)    ; GET MSB OF RESULT
00432 0281 67                   LD      H,A             ; STORE IT IN REGISTER H
00433 0282 DB00                 IN      A,(RESULTLB)    ; GET LSB OF RESULT
```

UNITED STATES PATENT AND TRADEMARK OFFICE
CERTIFICATE OF CORRECTION

PATENT NO. : 4,495,589
DATED : January 22, 1985
INVENTOR(S) : Edgar A. Hirzel

It is certified that error appears in the above-identified patent and that said Letters Patent is hereby corrected as shown below:

```
TEKTRONIX       Z80 ASM V3.3                                    PAGE   16

00434 0284 6F                       LD      L,A         ; STORE IT IN REGISTER L 00436 0285 C35402  )                JP      CORREL5     ; START NEW CORRELATION 00438 028B 41           CORREL3     LD      B,C         ; GET THE REPEAT COUNTER
00439 0289 1698                     LD      D,152       ; PRESET REGISTER D
00440 028B 3A201C                   LD      A,(SHIFT)   ; GET PREVIOUS SHIFT
00441 028E 4F                       LD      C,A         ; PUT IT IN REGISTER C 00443 028F DD7E00       CORREL6     LD      A,(IX+0)    ; GET LAST CORRELATION SHIFT
00444 0292 91                       SUB     C           ; SUBTRACT PREVIOUS ONE
00445 0293 3002                     JR      NC,CORREL7  ; IF NEW ONE IS GREATER THEN COMPARE
                                                          WITH MIN DIFFERENCE
00446 0295 ED44                     NEG                 ; OTHERWISE NEGATE THE RESULT 00448 0297 BA           CORREL7     CP      D           ; COMPARE WITH MINIMUM DIFFERENCE
00449 0298 2809                     JR      Z,CORREL8   ; NEW ONE IS EQUAL
00450 029A 3008                     JR      NC,CORREL9  ; NEW ONE IS GREATER
00451 029C 57                       LD      D,A         ; OTHERWISE MAKE NEW SMALLER DIFFERENCE
00452 029D DD5E00                   LD      E,(IX+0)    ; STORE THIS SHIFT
00453 02A0 C34702  )                JP      CORREL9     ; CONTINUE LOOKING FOR SHIFT CLOSEST TO
                                                          PREVIOUS ONE
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00455 02A3 3A2D1C    CORREL8    LD      A,(SHIFT)      ; IF THEY WERE EQUAL-GET THE MIDDLE
00456 02A6 5F                   LD      E,A            ; STORE THE SHIFT 00458 02A7 DD2B      CORREL9    DEC     IX             ; GET NEW LOCATION
00459 02A9 10E4                 DJNZ    CORREL6        ; CONTINUE TILL ALL MAXIMUM CORRELATIONS ARE
                                                         CHECKED 00461 02AB 7B                   LD      A,E            ; STORE RESULTANT SHIFT
00462 02AC 322D1C                LD     (SHIFT),A      ; IF ALL LOCATIONS WERE CHECKED

00464                ;                   14. SET FLAG F2
00465                ;                   ***************

00467 02AF FDCB00CE              SET     1,(IY+0)       ; SET FLAG F2
00468 02B3 C37B01 )              JP      DELAYX         ; GO TO CALCULATE NEW DELAYS
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

TEKTRONIX      Z80 ASM V3.3      PAGE 17

```
00470              ;               6. SUBROUTINE AVERAGE
00471              ;               *************************

00473 02B6 01C900   AVERAGEX   LD      BC,201      ; SET THE COUNTER
00474 02B9 AA                  XOR     D           ; CLEAR REGISTER DE
00475 02BA AB                  XOR     E
00476 02BB DD210000             LD      IX,0        ; CLEAR REGISTER IX 00478 02BF 0B       AVERAGE1   DEC     BC          ; DECREMENT THE COUNTER
00479 02C0 78                  LD      A,B         ; CHECK THE COUNTER
00480 02C1 B1                  OR      C
00481 02C2 200A                JR      NZ,AVERAGE2

00483 02C4 23                  INC     HL          ; GET ADDRESS OF NEXT LOCATION
00484 02C5 23                  INC     HL
00485 02C6 5E                  LD      E,(HL)      ; GET THE DATA
00486 02C7 CB3B                SRL     E           ; DIVIDE BY 2 (TO STAY WITHIN 16 BITS)
00487 02C9 DD19                ADD     IX,DE       ; ADD TO THE PREVIOUS SUM
00488 02CB C3BF02              JP      AVERAGE1    ; CONTINUE TILL ALL SET IS ADDED 00490 02CE DDE5     AVERAGE2   PUSH    IX          ; SUM IS RELOADED IN AF SO
00491 02D0 F1                  POP     AF          ; AVERAGE (OVER 512) IS IN A
00492 02D1 C9                  RET
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX         Z50 ASM V3.3                              PAGE    18

00494             ;            18. SUBROUTINE DIVIDE BY 8 BITS (8 OR 16)
00495             ;            ********************************************

00497             ;            TO DIVIDE 16 BITS BY 8 BITS
00498             ;            DIVISOR IS IN REGISTER E
00499             ;            NUMERATOR IS IN REGISTER PAIR HL
00500             ;            CALL DIVID816
00501             ;            RESULT WILL BE IN REGISTER PAIR HL

00503             ;            TO DIVIDE 8 BITS BY 8 BITS
00504             ;            DIVISOR IS IN REGISTER E
00505             ;            NUMERATOR IS IN REGISTER L
00506             ;            CALL DIVID88
00507             ;            RESULT WILL BE IN REGISTER L 00509 02D2 4C     DIVID816     LD      C,H         ; LOAD MSB OF NUMERATOR
00510 02D3 AF                  XOR     A           ; CLEAR ACCUMULATOR
00511 02D4 CDE102 )             CALL    DIVIDE2X    ; DIVIDE 8 BY 8
00512 02D7 61                  LD      H,C         ; STORE MSB OF RESULT
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00514 02D8 4D         MIDDLE2    LD     C,L          ; LOAD LSB OF NUMERATOR
00515 02D9 CDE102                CALL   DIVIDE2X     ; DIVIDE 8 BY 8
00516 02DC 69                    LD     L,C          ; STORE LSB OF RESULT
00517 02DD C9                    RET 00519 02DE AF         DIVID86    XOR    A            ; CLEAR ACCUMULATOR
00520 02DF 18F7                  JR     MIDDLE2      ; GO TO 8 BY 8 DIVIDE 00522 02E1 0608       DIVIDE2X   LD     B,8
00523 02E3 CB21       DIVIDE2C   SLA    C
00524 02E5 CB17                  RL     A
00525 02E7 3803                  JR     C,DIVIDE2A
00526 02E9 9B                    CP     E
00527 02EA 3803                  JR     C,DIVIDE2B
00528 02EC CBC1       DIVIDE2A   SET    0,C
00529 02EE 93                    SUB    E
00530 02EF 10F2       DIVIDE2B   DJNZ   DIVIDE2C
00531 02F1 C9                    RET
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX        Z80 ASM V3.3                                    PAGE   19

00533            ;                19.SUBROUTINE DIVIDE BY 16 BITS (32 OR 16 BITS)
00534            ;                **********************************************

00536            ;                TO DIVIDE 32 BITS BY 16 BITS
00537            ;                DIVISOR IS IN REGISTER PAIR DE
00538            ;                NUMERATOR IS IN REGISTER PAIRS IX,HL (MSB,LSB)
00539            ;                CALL DIVID163
00540            ;                RESULT WILL BE IN REGISTER PAIRS IX,HL (MSB,LSB)

00542            ;                TO DIVIDE 16 BITS BY 16 BITS
00543            ;                DIVISOR IS IN REGISTER PAIR DE
00544            ;                NUMERATOR IS IN REGISTER PAIR HL
00545            ;                CALL DIVID161
00546            ;                RESULT WILL BE IN REGISTER PAIR HL 00548 02F2 E5      DIVID163       PUSH   HL              ; SAVE HL
00549 02F3 DDE5                   PUSH   IX              ; RELOAD IX IN BC
00550 02F5 C1                     POP    BC
00551 02F6 AC                     XOR    H               ; CLEAR HL
00552 02F7 AD                     XOR    L
00553 02F8 CD0C03                 CALL   DIVIDE1X        ; DIVIDE 16 BY 16
00554 02FB C5                     PUSH   BC              ; RELOAD MSB OF RESULT IN IX
00555 02FC DDE1                   POP    IX
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00557 02FE C1                       POP     BC          ; GET LSB IN BC
00558 02FF CD0C03  ) MIDDLE1        CALL    DIVIDE1X    ; DIVIDE 16 BY 16
00559 0302 C5                       PUSH    BC          ; RELOAD LSB OF RESULT IN HL
00560 0303 E1                       POP     HL
00561 0304 C9                       RET 00563 0305 E5      DIVID161         PUSH    HL          ; RELOAD HL IN BC
00564 0306 C1                       POP     BC
00565 0307 AC                       XOR     H           ; CLEAR HL
00566 0308 AD                       XOR     L
00567 0309 C30C03  )                JP      DIVIDE1X    ; GO TO DIVIDE 16 BY 16

00569 030C 3E10    DIVIDE1X         LD      A,16
00570 030E CB21    DIVIDE1C         SLA     C
00571 0310 CB10                     RL      B
00572 0312 CB15                     RL      L
00573 0314 CB14                     RL      H
00574 0316 380C                     JR      C,DIVIDE1A
00575 0318 ED52                     SBC     HL,DE
00576 031A CBC1                     SET     0,C
00577 031C 3008                     JR      NC,DIVIDE1B
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX    Z80 ASM V3.3                              PAGE    20

00578 031E CB81              RES     0,C
00579 0320 19                ADD     HL,DE
00580 0321 C32703 )          JP      DIVIDE1B
00581 0324 A7       DIVIDE1A AND     A              ; CLEAR CARRY WITHOUT DESTROYING ACCUMULATOR
00582 0325 ED52              SBC     HL,DE
00583 0327 CBC1              SET     0,C
00584 0329 3D       DIVIDE1B DEC     A
00585 032A C20E03 )          JP      NZ,DIVIDE1C
00586 032D C9                RET
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX       Z80 ASM V3.3                                PAGE   21

00588           ;         20. SUBROUTINE MULTIPLY 8 BITS BY 8 BITS
00589           ;         ***********************************************

00591           ;         MULTIPLIER IS IN REGISTER L
00592           ;         REGISTER H HAS TO BE CLEAR
00593           ;         MULTIPLICAND IS IN REGISTER E
00594           ;         CALL MULTIP88
00595           ;         RESULT WILL BE IN REGISTER PAIR HL 00597 032E AF   MULTIP88  XOR     A              ; CLEAR A
00598 032F 0608           LD      B,8            ; SET THE COUNTER 00600 0331 CB27 MULTIP1A  SLA     A              ; SHIFT A THROUGH CARRY
00601 0333 CB14           RL      H              ; IN H
00602 0335 CB25           SLA     L              ; SHIFT MULTIPLIER INTO CARRY
00603 0337 3004           JR      NC,MULTIP1B    ; IF NO CARRY CONTINUE SHIFT
00604 0339 83             ADD     A,E            ; OTHERWISE ADD MULTIPLICAND TO LSB
00605 033A 3001           JR      NC,MULTIP1B    ; IF NO CARRY CONTINUE SHIFT
00606 033C 24             INC     H              ; OTHERWISE INCREMENT MSB
00607 033D 10F2 MULTIP1B  DJNZ    MULTIP1A       ; LOOP 8 TIMES
00608 033F 6F             LD      L,A            ; RELOAD LSB IN L
00609 0340 C9             RET
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX        160 ASM V3.3                              PAGE   22

00611              ;              21. SUBROUTINE MULTIPLY 8 BITS BY 16 BITS
00612              ;              ************************************

00614              ;       MULTIPLIER IS IN REGISTER E
00615              ;       MULTIPLICAND IS IN REGISTER PAIR HL
00616          -   ;       REGISTER D HAS TO BE CLEAR
00617              ;       CALL MULTIF81
00618              ;       RESULT WILL BE IN REGISTERS A,HL (MSB,LSB) (24 BITS MAXIMUM)

00620 0341 4B      MULTIF81   LD    C,E        ; RELOAD E INTO C
00621 0342 EB                 EX    DE,HL      ; RELOAD HL INTO DE
00622 0343 AD                 XOR   L          ; CLEAR L
00623 0344 AF                 XOR   A          ; CLEAR A
00624 0345 0608               LD    B,B        ; SET THE COUNTER
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00626 0347 CB25   MULTIP2A   SLA    L              ; SHIFT L THROUGH CARRY
00627 0349 CB14              RL     H              ; IN H AND
00628 034B CB17              RL     A              ; IN A
00629 034D CB21              SLA    C              ; SHIFT MULTIPLIER INTO CARRY
00630 034F 3004              JR     NC,MULTIP2B    ; IF NO CARRY CONTINUE SHIFT
00631 0351 19                ADD    HL,DE          ; OTHERWISE ADD MULTIPLICAND TO LSB
00632 0352 3001              JR     NC,MULTIP2B    ; IF NO CARRY CONTINUE SHIFT
00633 0354 3C                INC    A              ; OTHERWISE INCREMENT MSB
00634 0355 10F0   MULTIP2B   DJNZ   MULTIP2A       ; LOOP 8 TIMES
00635 0357 C9                RET
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
TEKTRONIX        Z80 ASM V3.3                        PAGE    23

00637            ;              LOCATION ASSIGNMENT
00638            ;              ******************

00640    1C20    STACKPNT   EQU    1C20H
00641    1C21    DELTAT     EQU    1C21H
00642    1C22    DELTIME    EQU    1C22H
00643    1C23    EXPTIMEC   EQU    1C23H
00644    1C24    EXPTIMEN   EQU    1C24H
00645    1C25    DELAYC     EQU    1C25H
00646    1C27    DELAYN     EQU    1C27H
00647    1C29    FLAGBYTE   EQU    1C29H
00648    1C2A    AVERSET1   EQU    1C2AH
00649    1C2B    INTERDIR   EQU    1C2BH
00650    1C2D    SHIFT      EQU    1C2DH
00651    1C2E    RESULTMU   EQU    1C2EH
00652    1C2F    SHIFTPR    EQU    1C2FH
00653    1C93    ALTITLSB   EQU    1C93H
00654    1C94    ALTITMSB   EQU    1C94H
00655    1C95    SPEED      EQU    1C95H
00656    1000    RAM1       EQU    1000H
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

```
00658              ;              I/O ASSIGNMENT
00659              ;              *************

00661    0007    CTC1CH0    EQU    07H
00662    0017    CTC1CH1    EQU    17H
00663    0018    CTC2CH1    EQU    18H
00664    0028    CTC2CH2    EQU    28H
00665    0000    RAMENABL   EQU    00H
00666    000C    APERTURE   EQU    0CH
00667    0003    DIGIT1     EQU    03H
00668    0004    DIGIT2     EQU    04H
00669    0005    DIGIT3     EQU    05H
00670    0006    COUNTER    EQU    06H
00671    0000    RESULTLB   EQU    00H
00672    0001    RESULTMB   EQU    01H
00673    0001    RESULTTR   EQU    01H
00674    000A    OVEREXP    EQU    0AH
00675    000B    UNDEREXP   EQU    0BH
00676    0002    ALTIMET    EQU    02H
00677    000A    MULTACC    EQU    0AH
00678
```

UNITED STATES PATENT AND TRADEMARK OFFICE
CERTIFICATE OF CORRECTION

PATENT NO. : 4,495,589

DATED : January 22, 1985

INVENTOR(S) : Edgar A. Hirzel

It is certified that error appears in the above-identified patent and that said Letters Patent is hereby corrected as shown below:

TEKTRONIX    Z80 ASM V3.3  Symbol Table           Page   24

SCALARS

```
ALTIMET  0002      ALTITLSB 1C93      ALTITMSB 1C94     APERTURE 000C     AVERSET1 1C2A
COUNTER  0006      CTC1CH0  0007      CTC1CH1  0017     CTC2CH1  0018     CTC2CH2  0028
DELAYC - 1C25      DELAYN - 1C27      DELTAT - 1C21     DELTIME  1C22     DIGIT1 - 0003
DIGIT2 - 0004      DIGIT3 - 0005      EXPTIMEC 1C23     EXPTIMEN 1C24     FLAGBYTE 1C29
INTERDIR 1C2B     - MULTACC  000A      OVEREXP  000A     RAM1 ---  1000    RAMENABL 0000
RESULTLB 0000      RESULTMB 0001      RESULTMU 1C2E     RESULTTR 0001     SHIFT --  1C2D
SHIFTPR  1C2F      SPEED -- 1C95      STACKPNT 1C20     UNDEREXP 000B
```

UNITED STATES PATENT AND TRADEMARK OFFICE
CERTIFICATE OF CORRECTION

PATENT NO. : 4,495,589

Page 38 of 38

DATED : January 22, 1985

INVENTOR(S) : Edgar A. Hirzel

It is certified that error appears in the above-identified patent and that said Letters Patent is hereby corrected as shown below:

% (DEFAULT) SECTION (0359)

| | | | CONTINUE 0044 | AVERAGEX 02B6 |
|---|---|---|---|---|
| ALLSTORD 00F5 | AVERAGE1 02BF | AVERAGE2 02CE | CORREL3 0288 | CORREL2 0270 |
| CONVERT1 01E2 | CONVERTX 01D3 | CORREL1 0276 | CORREL8 02A3 | CORREL7 0297 |
| CORREL4 027D | CORREL5 0254 | CORREL6 026F | DELAY4 - 01B5 | DELAY2 - 01B4 |
| CORREL9 02A7 | CORRELX 0240 | DELAY1 - 0198 | DIVID816 02D2 | DIVID163 02F2 |
| DELAY5 - 01BE | DELAYX - 017D | DIVID161 0305 | DIVIDE1X 030C | DIVIDE1C 030E |
| DIVID88 02DE | DIVIDE1A 0324 | DIVIDE1B 0329 | EXPTIME1 011D | DIVIDE2X 02E1 |
| DIVIDE2A 02EC | DIVIDE2B 02EF | DIVIDE2C 02E3 | EXPTIME6 0171 | EXPTIME5 0177 |
| EXPTIME2 015C | EXPTIME3 014B | EXPTIME4 0153 | LOOP1 -- 007F | GOBACK - 0050 |
| EXPTIME7 012A | EXPTIMEX 0117 | GETSET2 00C7 | MULTIP1B 033D | MULTIP1A 0331 |
| LOOP2 -- 0082 | MIDDLE1 02FF | MIDDLE2 02D8 | NEWEXSET 0054 | MULTIP88 032E |
| MULTIP2A 0347 | MULTIP2B 0355 | MULTIP81 0341 | | |
| STORESET 00AD | | | | |

678 SOURCE LINES   678 ASSEMBLED LINES   11658 BYTES AVAILABLE

))) NO ASSEMBLY ERRORS DETECTED (((

Signed and Sealed this

Fourteenth Day of October, 1986

[SEAL]

Attest:

DONALD J. QUIGG

Attesting Officer

Commissioner of Patents and Trademarks